(12) United States Patent
Grossetete et al.

(10) Patent No.: US 11,682,497 B2
(45) Date of Patent: Jun. 20, 2023

(54) METHOD FOR REGULATING OPERATING PARAMETERS OF A NUCLEAR REACTOR AND CORRESPONDING NUCLEAR REACTOR

(71) Applicant: FRAMATOME, Courbevoie (FR)

(72) Inventors: Alain Grossetete, Nanterre (FR); Lori Lemazurier, La Celle Saint Cloud (FR); Philippe Chevrel, Carquefou (FR); Mohamed Yagoubi, Nantes (FR)

(73) Assignee: FRAMATOME, Courbevoie (FR)

( * ) Notice: Subject to any disclaimer, the term of this patent is extended or adjusted under 35 U.S.C. 154(b) by 155 days.

(21) Appl. No.: 16/966,445

(22) PCT Filed: Feb. 1, 2019

(86) PCT No.: PCT/EP2019/052543
§ 371 (c)(1),
(2) Date: Aug. 28, 2020

(87) PCT Pub. No.: WO2019/149907
PCT Pub. Date: Aug. 8, 2019

(65) Prior Publication Data
US 2022/0084706 A1  Mar. 17, 2022

(30) Foreign Application Priority Data

Feb. 1, 2018 (FR) ..................... 18 50867

(51) Int. Cl.
*G21D 3/10* (2006.01)
*G21D 3/00* (2006.01)
*G21C 7/36* (2006.01)

(52) U.S. Cl.
CPC ............... *G21D 3/10* (2013.01); *G21D 3/001* (2013.01); *G21C 7/36* (2013.01)

(58) Field of Classification Search
CPC ............. G21D 3/10; G21D 3/001; G21C 7/36
(Continued)

(56) References Cited

U.S. PATENT DOCUMENTS 4,318,778 A * 3/1982 Musick ................. G21D 3/001
376/216
6,400,786 B1   6/2002 Mourlevat et al.
(Continued)

FOREIGN PATENT DOCUMENTS

CN   203134387 U   8/2013
CN   102834874 B   6/2015
(Continued)

OTHER PUBLICATIONS

Corresponding Search Report PCT/EP2019/052543.
(Continued)

*Primary Examiner* — Jack W Keith
*Assistant Examiner* — Daniel Wasil
(74) *Attorney, Agent, or Firm* — Davidson, Davidson & Kappel, LLC

(57) ABSTRACT

A method regulates operating parameters comprising at least the mean temperature of the core ($T_m$), and the axial power (AO) imbalance. The method includes development of a vector ($U_S$) of control values of the nuclear reactor by a supervisor (31) implementing a predictive control algorithm; development of a vector ($u_K$) of corrective values of the nuclear reactor controls by a regulator (33) implementing a sequenced gain control algorithm; development of a vector (U) of corrected values of the commands of the nuclear reactor, by using the vector ($U_S$) of the values of the commands produced by the supervisor (31) and the vector ($u_K$) of the corrective values of the commands produced by the regulator (33); and regulation of the operating param-
(Continued)

eters of the nuclear reactor, by controlling actuators using the vector (U) of the corrected values of the controls.

23 Claims, 16 Drawing Sheets

(58) Field of Classification Search
USPC .................................................. 376/216, 217
See application file for complete search history.

(56) References Cited

U.S. PATENT DOCUMENTS

| | | | |
|---|---|---|---|
| 2006/0129362 A1* | 6/2006 | Mahe | G21C 17/00 703/2 |
| 2008/0069288 A1* | 3/2008 | Grossetete | G21C 7/08 376/217 |
| 2010/0260300 A1 | 10/2010 | Andre Poyaud et al. | |
| 2011/0026660 A1 | 2/2011 | Meier et al. | |
| 2015/0146836 A1 | 5/2015 | Takado et al. | |
| 2016/0071622 A1 | 3/2016 | Bakkali | |

FOREIGN PATENT DOCUMENTS

| | | |
|---|---|---|
| DE | 102012000529 A1 | 7/2013 |
| EP | 1860664 A1 | 11/2007 |
| FR | 3005196 A1 | 10/2014 |
| FR | 3013886 A1 | 5/2015 |
| JP | 2001033581 A | 2/2001 |
| JP | 2007322434 A | 12/2007 |
| JP | 2011506920 A | 3/2011 |
| JP | 2021512324 A | 5/2021 |
| KR | 20130028213 A | 3/2013 |
| KR | 20140024589 A | 3/2014 |
| RU | 2470391 C1 | 12/2012 |
| UA | 94897 C2 | 6/2011 |

OTHER PUBLICATIONS

Hah Y-J et al. "Fuzzy Power Control Algorithm for a Pressurized Water Reactor", Nuclear Technology, American Nuclear Society, Chicago, IL, vol. 106, No. 2, May 1, 1994, pp. 242-253.

* cited by examiner

METHOD FOR REGULATING OPERATING PARAMETERS OF A NUCLEAR REACTOR AND CORRESPONDING NUCLEAR REACTOR

The present disclosure relates to the regulation of operating parameters of a nuclear reactor.

BACKGROUND

Given the large share of nuclear power in the French energy mix, the massive introduction of renewable energy sources (wind and solar) into the electricity grid induces an additional need for flexibility in energy production, thus affecting nuclear reactors. Flexibility reflects the capacity of an electricity production unit to adapt its production. Renewable energies have the particularity of being intermittent over time or dependent upon climatic uncertainties. In the absence of a mass energy storage system, this increase in flexibility induces an increased need for adjusting the power made available by traditional generators, including nuclear reactors in France.

In addition, the regulation of the operating parameters of a nuclear reactor must be done in accordance with very restrictive multi-objective specifications. In particular, the regulatory systems must minimize the variations of the operating parameters and minimize the stresses on the actuators. At present, the regulatory systems of nuclear reactors are based on PIDs. However, they can only take these last constraints into account in a very imperfect manner.

SUMMARY

In this context and according to a first aspect, an aim of the present disclosure is to provide a method of regulating the operating parameters of a nuclear reactor offering additional flexibility, while allowing compliance with very restrictive multi-objective specifications.

To this end, the present disclosure relates to a method of regulating operating parameters of a nuclear reactor, these operating parameters comprising at least the average temperature of the core and the axial power imbalance, the method comprising the following steps:

acquisition of a current value of at least one input;
acquisition of a current value of an output vector, the outputs comprising at least the operating parameters;
development of a reference value of the vector of the outputs, using the current value of the at least one input;
development of a vector of control values of the nuclear reactor by a supervisor implementing a predictive control algorithm, using at least said current value of at least one input and the current value of the vector of the outputs;
development of a vector of corrective values of the nuclear reactor commands by a regulator implementing a sequenced gain control algorithm, using the current value of the vector of the outputs and the reference value of the vector of the outputs;
development of a vector of corrective values of the nuclear reactor commands, using the vector of command values developed by the supervisor, and the vector of corrective values of the commands developed by the regulator;
regulation of the operating parameters of the nuclear reactor, by controlling actuators using the vector of corrected values of the commands.

The regulation process may also have one or more of the characteristics below, considered individually or in any technically feasible combination:

the nuclear reactor comprises:
  a tank;
  a core comprising a plurality of nuclear fuel assemblies, placed in the tank;
  core reactivity control clusters, and mechanisms configured to move each cluster in the direction of insertion into the core or in the direction of extraction out of the core;
  a primary core cooling circuit in which a primary coolant circulates, comprising cold and hot branches pierced in the tank and through which the primary coolant respectively enters the tank and leaves the tank;
  an injection circuit, configured to selectively inject a neutron poison or diluent fluid without neutron poison into the primary heat transfer fluid;
the controls comprising at least one rate of movement of the control clusters and at least one rate of injection of neutron poison or of diluent fluid;
the clusters are moved in groups, one or more groups being brought together in a first set, the commands comprising at least one rate of movement of the group(s) of the first set;
other groups are grouped together in a second set, the commands comprising, in addition to the rate of movement of the groups of the first set, at least one rate of movement of the groups of the second set;
the groups of the first set are moved sequentially;
the first set has only one group;
the operating parameters further include the position of insertion of the groups of the first set;
the nuclear reactor comprises one or more turbines supplied with steam by the primary circuit, the at least one input being power demanded from the turbine(s) of the nuclear reactor;
the power supplied by the turbine(s) of the nuclear reactor comprises a power programmed according to a predetermined program, for example predetermined for a period of at least one day, and a power disturbance, the reference value of the vector of the outputs being determined by using said programmed power alone;
the outputs comprise, in addition to the operating parameters, a temperature of the primary coolant in the hot branch, and a thermal power of the core;
the sequenced gain control algorithm comprises a plurality of linear regulators, each determined for a specific operating point of the nuclear reactor, said operating points preferably being staggered to cover a power range of the nuclear reactor ranging from 25% to 100% of a nominal power of the nuclear reactor;
each operating point is characterized by a determined insertion position of the first set of groups;
each linear regulator is expressed in the following form:

$$u_K = K_p(s)y_1 + K_i(s)y_2 \text{ with } y_1 = y \text{ and } y_2 = z$$

where $K_p$ and $K_1$ are gain matrices, s is the Laplace variable, y being an output deviation vector between the current value of the output vector and the reference value of the output vector, z being a deviation vector of operating parameters between the current value of the vector of operating parameters to be checked and the reference value of the vector of operating parameters to be checked, and $u_K$ being the vector of the corrective values of the commands;

the method comprises a step of obtaining linear regulators, comprising for each linear regulator, the following sub-steps:
  development of a linearized model of the nuclear reactor by linearization of a nonlinear model of the nuclear reactor at the corresponding operating point, the linearized model relating:
    the output deviation vector and the operating parameter deviation vector on the one hand, with
    at least one disturbance of the at least one input, of a disturbance of the vector of control values, of a disturbance of the output deviation vector and of the vector of corrective values of the control values elsewhere;
  the linearized model and the linear regulator thus forming a looped system for said insertion position;
  determination of operating constraints of the nuclear reactor to be observed for predetermined disturbances of the at least one input or predetermined disturbances of the vector of the values of the commands or of the predetermined disturbances of the output deviation vector;
  translation of each operating constraint into a digital condition to be respected for a transfer function between:
    the disturbance of at least one input, or disturbance of the vector of control values, or disturbance of the output deviation vector, on the one hand, and
    either the difference between the current value of one of the operating parameters and the reference value of said operating parameter, or the difference between the current value of one of the outputs and the reference value of said output, or one of the corrective values of the commands, on the other hand;
  determination of the gains of the gain matrices $K_p$ and $K_1$, said gains being determined by an optimization algorithm, so as to stabilize at least the looped system for the corresponding operating point and to satisfy the digital conditions corresponding to all the operating constraints;
one or more of the following operating constraints are taken into account to obtain the linear regulator:
  the difference between the current value of $T_m$ and the reference value $T_{m,ref}$ lies between $-\Delta T_m^{max}$ and $+\Delta T_m^{max}$;
  the difference $\delta AO$ between the current value of AO and the reference value $AO_{ref}$ lies between $-\Delta AO^{max}$ and $\Delta AO^{max}$;
  the rate of movement of the clusters is less than $V_{barres}^{max}$;
  the variation in neutron poison concentration is less than $u_Q^{max}$, $u_Q^{max}$ being the rate of increase in the neutron poison concentration in the primary circuit resulting from an injection of neutron poison at a flow rate $Q_{bor}^{max}$;
to be observed at least for a disturbance which is a power step demanded from the turbine(s) of ±P% of a nominal power PN of the nuclear reactor, P being between 5 and 15%;
  said one or more operating constraints are translated into one or more of the following numerical conditions:
    $\|W_{T_m} \cdot T_{\delta T_m \to d_P}\|_\infty \leq 1$, où $T_{\delta T_m \to d_P}$ is the transfer function between said power step and $\delta T_m$, with $$W_{T_m} = \frac{\Delta T_m^{max}}{\Delta P_{max}},$$

$\Delta P_{max} = P\% \cdot PN$;
    $\|W_{AO} \cdot T_{\delta AO \to d_P}\|_\infty \leq 1$, où $T_{\delta AO \to d_P}$ is the transfer function between said power step and $\delta AO$, with $$W_{AO} = \frac{\Delta AO^{max}}{\Delta P_{max}},$$

$\Delta P_{max} = P\% \cdot PN$;
    $\|W_K \cdot T_{Vbarres \to d_P}\|_\infty \leq 1$, where $T_{Vbarres \to d_P}$ is the transfer function between said power step and the rate of movement of the clusters, with $$W_K = \frac{V_{barres}^{max}}{\Delta P_{max}};$$

$\|W_Q \cdot T_{u_Q \to d_P}\|_\infty \leq 1$, where $T_{u_Q \to d_P}$ is the transfer function between said power step and the variation in the concentration of the neutron poison, with $$W_Q = \frac{u_Q^{max}}{\Delta P_{max}};$$

the following operating constraint is taken into account to obtain the linear regulator:
    the difference $\delta P_{bank}$ between the current value of $P_{bank}$ and the reference value of $P_{bank,ref}$ lies between $-\Delta P_{bank}^{max}$ and $\Delta P_{bank}^{max}$;
to be observed at least for a disturbance which is a power step requested from the turbine(s) of ±P% of a nominal power PN of the nuclear reactor, P being between 5 and 15%;
  said operating constraint is translated into the following digital condition:
    $\|W_P \cdot T_{\delta P_{bank} \to d_P}\|_\infty \leq 1$, where $T_{\delta P_{bank} \to d_P}$ the transfer function between said power step and $\delta P_{bank}$, with $$W_P = \frac{\Delta P_{bank}^{max}}{\Delta P_{max}},$$

$\Delta P_{max} = P\% \cdot PN$;
  the following operating constraint is taken into account to obtain the linear regulator:
    a disturbance which is a power step demanded from the turbine(s) of ±P% of a nominal power PN of the nuclear reactor, P being between 5 and 15%, causes a minimum variation of the operating parameters;
  said constraint being translated into the following digital condition:

$$\min_{K \in \Omega} \|W_z \cdot T_{z \to d_P}\|_2,$$

where K denotes the gain matrices $K_p$ and $K_i$, $\Omega$ denotes the set of gain matrices stabilizing the loop system, $T_{z \to d_P}$ is the transfer function between said power step and the operating parameter deviation vector, $W_z$ is a predetermined frequency weighting matrix;

each linearized model takes into account the delay linked to the injection of the neutron poison using the following equations:

$$\frac{dC_b}{dt}(t) = \overline{u_Q}; \overline{u_Q} = R_B(s) \cdot u_Q; R_B(s) = \frac{\left(1 - \frac{h}{2n}s\right)^n}{\left(1 + \frac{h}{2n}s\right)^n}$$

where $C_b$ is the concentration of neutron poison in the or each primary circuit; $u_Q$ is the command to increase the concentration of neutron poison in the primary circuit resulting from a command for injecting neutron poison at a flow rate $Q_{bor}$, $\overline{u_Q}$ is the delayed command to increase the concentration of neutron poison in the primary circuit; s is the Laplace variable; h is the value of the delay in question, typically between 100 and 500 seconds; n is an integer ranging from 3 to 15;

at a determined operating point, the gains of the gain matrices $K_p$ and $K_1$ are determined by the optimization algorithm so as to stabilize the looped system for said determined operating point and to stabilize the looped systems for at least the two neighboring determined operating points, while satisfying the digital conditions corresponding to all the operating constraints;

the supervisor's predictive control algorithm uses said nonlinear model of the nuclear reactor.

According to a second aspect, the present disclosure relates to a nuclear reactor comprising:

a core and an assembly for regulating the operating parameters of the core, these operating parameters comprising at least the mean temperature of the core and the axial power imbalance, the nuclear reactor further comprising:

an acquisition unit with a current value of at least one input;

a device for acquiring a current value of a vector of outputs, the outputs comprising at least the operating parameters;

the regulation assembly comprising:

a module for developing a reference value of the vector of the outputs, using the current value of the at least one input;

a supervisor programmed to develop a vector of control values for the nuclear reactor by implementing a predictive control algorithm, using at least said current value of at least one input and the current value of the vector of outputs;

a regulator programmed to develop a vector of corrective values for the nuclear reactor controls by implementing a sequenced gain control algorithm, using the current value of the vector of the outputs and the reference value of the vector of the outputs;

a module for developing a vector of corrective values for the nuclear reactor commands, using the vector of command values developed by the supervisor and the vector of corrective values for the commands developed by the regulator;

a module for regulating the operating parameters of the nuclear reactor, controlling actuators using the vector (U) of the corrected values of the commands.

The nuclear reactor may also have one or more of the characteristics below, considered individually or in any technically feasible combination:

the nuclear reactor comprises:
  a tank;
  a core comprising a plurality of nuclear fuel assemblies, placed in the tank;
  core reactivity control clusters, and mechanisms configured to move each cluster in the direction of insertion into the core or in the direction of extraction out of the core;
  a primary core cooling circuit in which a primary coolant circulates, comprising cold and hot branches pierced in the tank and through which the primary coolant respectively enters the tank and leaves the tank;
  an injection circuit, configured to selectively inject a neutron poison or diluent fluid without neutron poison into the primary heat transfer fluid; the commands comprising at least one rate of movement of the control clusters and at least one rate of injection of neutron poison or of diluent fluid;

the regulation assembly is configured to move the clusters in groups, one or more groups being brought together in a first set, the controls comprising at least one rate of movement of the groups of the first set;

other groups are grouped together in a second set, the commands comprising, in addition to the rate of movement of the groups of the first set, at least one rate of movement of the groups of the second set;

the groups of the first set are moved sequentially;

the first set has only one group;

the operating parameters further comprise the position of insertion of the groups of the first set;

the nuclear reactor comprises one or more turbines supplied with steam by the primary circuit, the at least one input being a power demanded from the turbine(s) of the nuclear reactor;

the power supplied by the turbine(s) of the nuclear reactor comprises a power programmed according to a predetermined program, for example predetermined for a period of at least one day, and a power disturbance, the reference value of the vector of the outputs being worked out using said programmed power alone;

the outputs comprise, in addition to the operating parameters, a temperature of the primary coolant in the hot branch, and a thermal power of the core;

the sequenced gain control algorithm comprises a plurality of linear regulators, each determined for a specific operating point of the nuclear reactor, said operating points being scaled to cover a power range of the nuclear reactor ranging from 25% to 100% of a nominal power of the nuclear reactor;

each operating point is characterized by a determined insertion position of the first set of groups;

each linear regulator is expressed in the following form:

$$u_K = Kp(s)y_1 + Ki(s)y_2 \text{ with } y_1 = y \text{ and } y_2 = z$$

where $K_p$ and $K_1$ are gain matrices, s the Laplace variable, y being an output deviation vector between the current value of the output vector and the reference value of the output vector, z being a deviation vector of operating parameters between the current value of the vector of the operating parameters to be checked and the reference value of the vector of the operating parameters to be checked, and $u_K$ being the vector of the corrective values of the commands.

BRIEF DESCRIPTION OF THE DRAWINGS

Other characteristics and advantages of the present disclosure will emerge from the detailed description which is given below, by way of indication and in no way limiting, with reference to the appended figures, among which.

DETAILED DESCRIPTION

Figure 1:
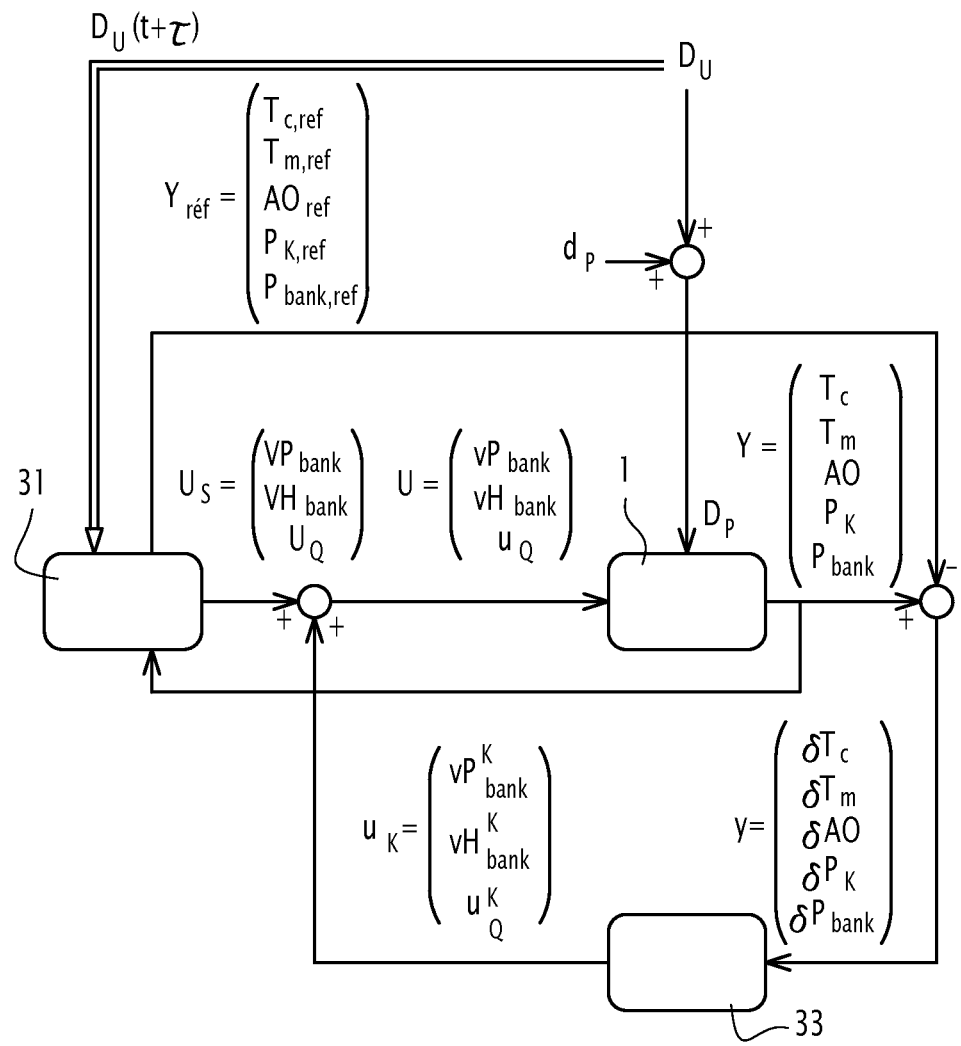
FIG. 1 is a schematic representation of a regulation method of the present disclosure.
Figure 2:
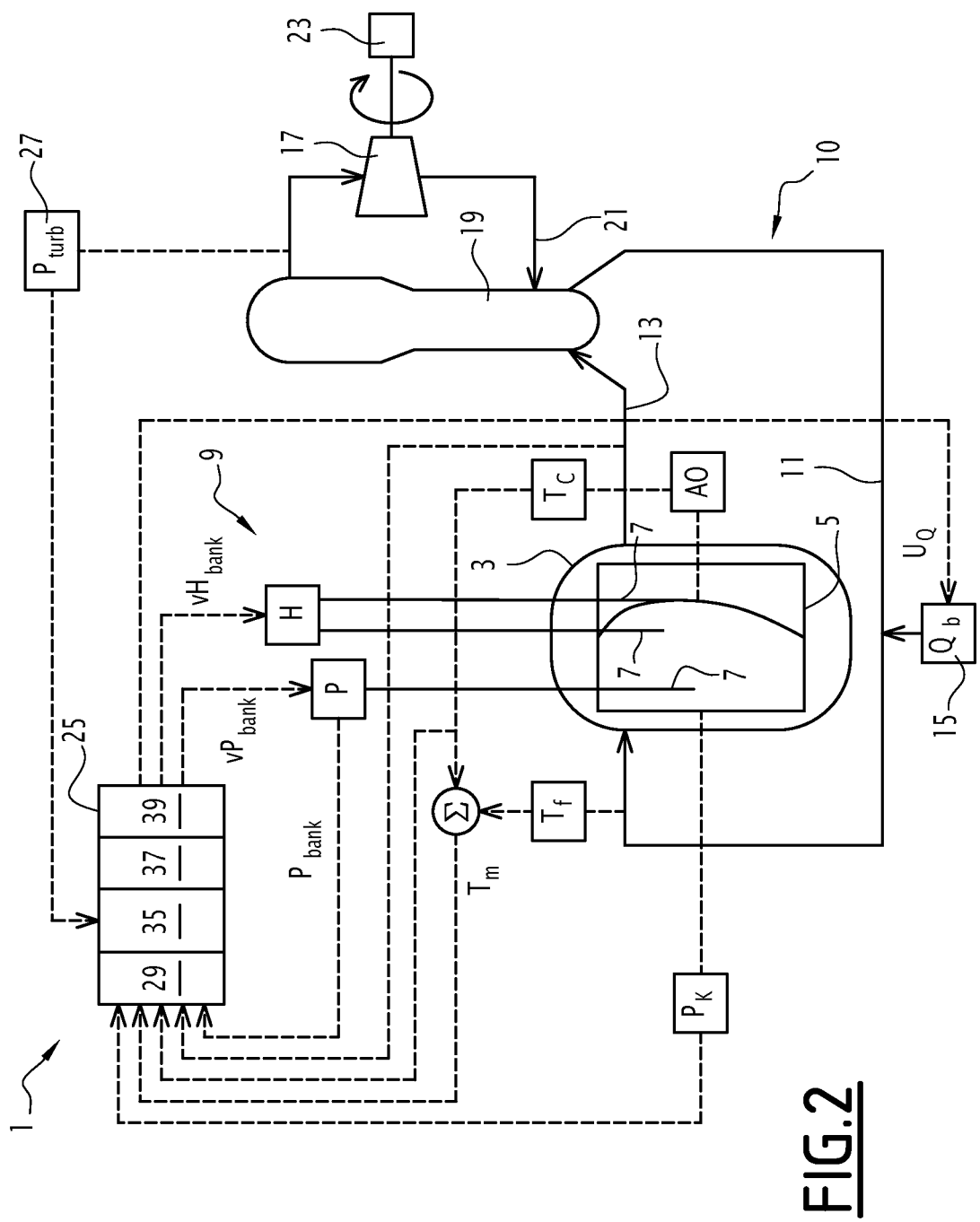
FIG. 2 is a schematic representation of a nuclear reactor in which the method of FIG. 1 is likely to be implemented.

The method represented schematically in FIG. 1 aims to regulate operating parameters of a nuclear reactor 1 represented diagrammatically in FIG. 2.

The nuclear reactor 1 comprises:
a tank 3;
a core 5 comprising a plurality of nuclear fuel assemblies, placed in the tank 3;
the clusters 7 for controlling the reactivity of the core, and mechanisms 9 configured to move each cluster 7 in the direction of insertion into the core 5 or in the direction of extraction out of the core 5;
a primary circuit 10 for cooling the core 5 in which a primary coolant circulates, comprising cold and hot branches 11, 13 pierced in the tank 3 and through which the primary coolant respectively enters the tank 3 and leaves the tank 3;
an injection circuit 15, configured to selectively inject a neutron poison or diluent fluid without neutron poison into the primary heat transfer fluid.

The neutron poison is typically boron. The diluent fluid is typically water.

Typically, the primary circuit 10 comprises one or more loops, each with a hot branch and a cold branch.

The nuclear reactor 1 comprises one or more turbines 17 supplied with steam by the primary circuit 10.

The nuclear reactor 1 is typically a PWR (Pressurized Water Reactor). It comprises a steam generator 19 for each loop of the primary circuit 10. Each loop connects the tank 3 in a closed circuit to a primary side of the associated steam generator 19. Furthermore, the nuclear reactor 1 comprises a secondary circuit 21 connecting in a closed circuit, a secondary side of the or each steam generator 19 to the associated turbine 17. Turbine 17 drives an alternator 23.

As a variant, the primary heat transfer fluid directly may drive each turbine.

The nuclear reactor 1 also includes a set of 25 control operating parameters of the core, typically called Core Control. The regulation assembly 25 comprises, for example, an information processing unit, formed by a processor and a memory associated with the processor (not shown). As a variant, the regulation assembly 25 is produced in the form of programmable logic components such as FGPAs (Field-Programmable Gate Array), or else in the form of dedicated integrated circuits such as ASICs (Application-Specific Integrated Circuit).

The regulation assembly 25 is configured to move the clusters 7 by functional groups. The clusters of the same group are moved together, and are always all in the same insertion position.

The groups are advantageously divided into one or more sets. The distribution of the groups and their use depend on the control mode of the nuclear reactor.

In certain control modes, several groups are brought together in a first set.

In this case, the groups of the first set are typically moved sequentially. By this is meant that they are inserted one after the other, with an overlap which is predetermined and as described below. Alternatively, the overlap may be variable.

According to an alternative embodiment, all the groups of the first set are moved together. This is understood to mean that they are all always in the same insertion position and move together.

In other control modes, the first set has only one group.

In some control modes, other groups are brought together in a second set.

In this case, the groups of the second subset are typically moved together.

In other control modes, all the groups are gathered in the first set, and there is no second set.

In still other control modes, certain groups are gathered in a third set in addition to the first and second sets.

In all cases, the regulation assembly moves the groups of the same assembly in a coordinated manner (sequentially, jointly, etc.). The regulation assembly moves the groups of the or each assembly to control the operation of the reactor, in particular to regulate the operating parameters.

Several examples of control mode are detailed below, inspired respectively by modes T, G and A.

In a control mode inspired by T mode, particularly suited to the European Pressurized Reactor (EPR), the groups are divided into two sets:
the first set, called Pbank;
the second set, called Hbank.

The first set is particularly well suited for checking the average temperature Tm. The second set Hbank is particularly well suited for checking the axial offset AO.

The first and second sets are of variable composition, as described below.

For example, the control clusters 7 are grouped into 5 groups P1 to P5.

Figure 3:
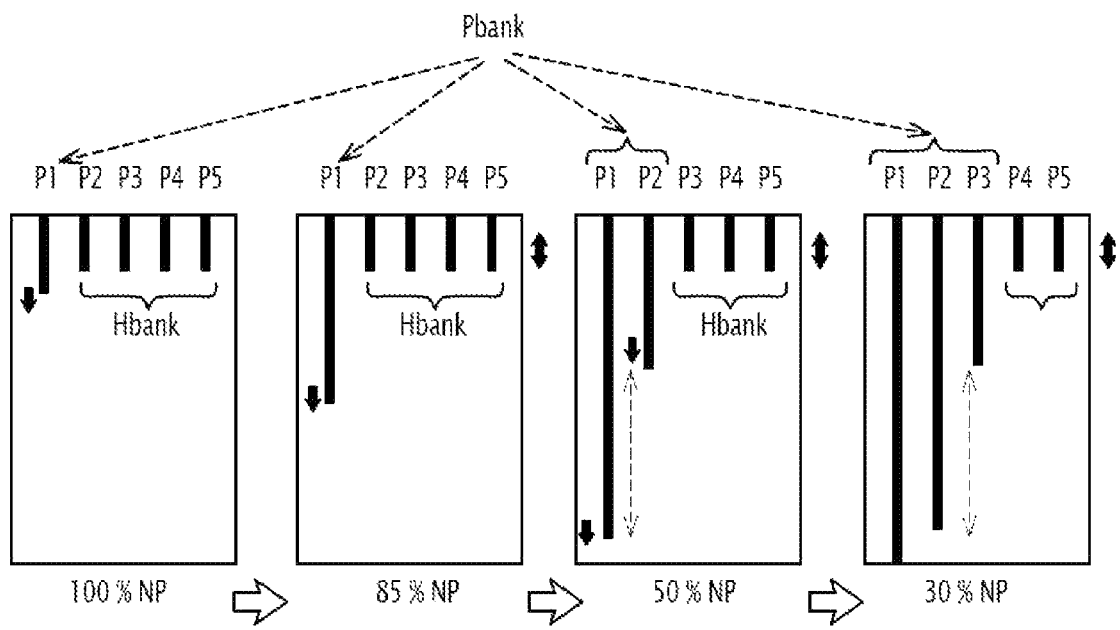
FIG. 3 is a schematic representation of the sequence for inserting the groups of the first set, for a variant of the regulation method adapted from the T mode.

As shown in FIG. 3, groups P1 to P5 make up the Pbank and Hbank groups as follows:

At 100% of the nominal power PN of the reactor, Pbank is composed of P1 and Hbank from P2 to P5. Pbank is slightly more inserted than Hbank.

When the power decreases to 85% PN, Pbank is inserted so as to control the average temperature to its reference. The decrease in potency causes variations in AO controlled by Hbank.

The power continues to decrease. When the distance between P1 and P2 becomes equal to the maximum spacing between two groups of clusters (half the height of the core), P2 separates from the Hbank group and passes into the Pbank group. It is then inserted with P1.

When the power continues to decrease, Pbank continues to be inserted. When the maximum distance between P2 and P3 is reached, P3 passes into Pbank and is inserted, and so on with P4.

The sequence would be the same if the control clusters were grouped into a different number of clusters.

Thus, the groups of the first set Pbank are moved sequentially. The groups of the second Hbank set are moved together.

The term "position of the first Pbank set" is understood here to mean the cumulative position of the groups belonging to the first set. This position is denoted $P_{bank}$.

For example, the position is calculated using the following equation:

$$P_{bank} = \min(P_4, 214) + \min(P_3, 214) + \min(P_2, 214) + P_1$$

where $P_1$, $P_2$, $P_3$ and $P_4$ denote the positions of groups P1 to P4 respectively. The value 214 is chosen for a mid-core position of the cluster groups. The position is expressed in number of extraction steps from the maximum insertion position of the groups By position of the second set Hbank is meant here the position of group P5, which is never integrated into the first Pbank set.

In a second control mode, inspired by G mode, the groups are divided into two sets:

the first set includes a single group, the R group, formed of black clusters, i.e. very absorbent clusters;

the second set, called PCG for Power Compensation Group, is made up of groups G1 and G2 (G for gray clusters) and groups N1 and N2 (N for black clusters). Gray clusters are relatively less absorbent than black clusters.

The groups of this second subset are inserted sequentially. Advantageously, they are inserted as a function of the electrical power demanded from the turbine.

In this second control mode, the AO is advantageously controlled mainly by injections of neutron poison or of diluent.

In a third control mode, inspired by mode A, the functional groups are all grouped together in the first set, here designated by the acronym DCBA.

This is typically made up of four groups A, B, C and D, which fit sequentially like the Pbank.

The first set is particularly well suited for controlling the average temperature Tm.

In this third control mode, the AO is advantageously controlled mainly by injections of neutron poison or of diluent fluid.

The operating parameters to be controlled include at least the average temperature of the core Tm and the axial power AO imbalance.

The average core temperature $T_m$ is defined here as being the average between $T_f$ and $T_c$, $T_f$ and $T_c$ being the temperatures of the primary coolant at the outlet of the core 3 and at the inlet of the core 3, i.e. at the hot and cold branches 13 and 11.

When the primary circuit has several loops, the average temperature of the hot and cold branches of the primary circuits is considered for example.

The axial power imbalance AO is expressed using the following relation:

$$AO = (FH - FB)/(FH + FB)$$

where FH and FB are the neutron fluxes respectively in the upper and lower parts of the core.

Advantageously, the operating parameters to be checked further include the position $P_{bank}$ of the groups of the first set.

This is typically the case at least for the first mode of controlling the reactor.

This amounts to controlling the operating parameter Pmax, i.e. the maximum power that may be reached by rapidly extracting the groups to their maximum extraction position.

In fact, the Pmax is advantageously translated into a reference position of the Pbank group making it possible to compensate for the power fault. Controlling the Pmax therefore amounts to controlling the position of the Pbank group according to an insertion profile determined as a function of the power of the core and the power to which the operator wants to be able to return. For example, a Pmax of 100% PN means that the position of the Pbank group makes it possible to return to 100% PN only by its extraction.

For the second and third modes of controlling the reactor, the position of the groups of the first set is not typically part of the operating parameters to be controlled. These only include Tm and AO.

The regulation process takes into account at least one input and several outputs, as shown in FIG. 1.

An input is defined either as a predicted path, or as an additional constraint or a constraint modification applied to the control process.

The at least one input is typically a power demanded from the turbine(s) of the nuclear reactor.

Typically, the power supplied by the turbine(s) 17 of the nuclear reactor comprises two components: a programmed power $D_U$, according to a predetermined program, and a power disturbance dp. The programmed power is, for example, predetermined for a period of at least one day. The power disturbance corresponds, for example, to an adjustment made in the operation of the primary circuit, or of the secondary circuit, to a charge reserve step, etc.

According to an alternative embodiment, the term power demanded from the turbines or nuclear power reactor is understood to mean the programmed power $D_U$.

According to another variant embodiment, the term "power requested from the turbine(s) of the nuclear reactor" is understood to mean the power supplied $D_P$, with $D_P = D_U + dp$.

The at least one alternative input includes one or more of the inputs below, in addition to, or in place of, the power demanded from the turbine(s):
   maximum programmed insertion of the Pbank group;
   widening of the authorized variation range of a physical parameter such as the mean core temperature or the axial power AO imbalance;
   degradation of actuator performance (speed of insertion of control units, injection rate of boron or distilled water).
   This list is not exhaustive.

The outputs preferably include, in addition to the operating parameters, the temperature $T_c$ of the primary coolant in the hot branch 13, and the thermal power of the core Pk.

To allow regulation, the nuclear reactor 1 comprises:
an acquisition unit 27 of a current value of the at least one input;
an acquisition unit 29 of a current value of a vector of the outputs.

The nuclear reactor 1 comprises a control system equipped with a set of sensors making it possible to access the current values of the following quantities: $T_c$, $T_f$, AO, the power of the core $P_K$, and $P_{bank}$.

The control system may also provide $D_U$ and is equipped with sensors for accessing $D_P$.

The acquisition unit 27 is configured to acquire the current value of the power demanded from the turbine(s) directly from the control system.

The acquisition unit 29 is configured to acquire the current values of certain outputs directly from the control system, in particular $T_c$, AO, $P_K$, and $P_{bank}$. The acquisition unit 29 is configured to calculate the current values of the other outputs from values supplied by the control system, in particular Tm.

The acquisition units 27 and 29 are, for example, modules of the regulation assembly 25 or directly inform the regulation assembly 25.

In the regulation process, the operating parameters are regulated by giving commands to actuators.

These commands advantageously comprise at least one rate of movement $V_{barres}$ of the control clusters, and at least one injection rate of neutron poison or of diluent fluid.

In certain control modes (the first control mode for example), the at least one rate of movement $V_{barres}$ of the control clusters typically comprises the rate of movement of the groups of the first Pbank set and the rate of movement of the groups of the second Hbank set.

These rates correspond to the derivatives over time of the position of the first $P_{bank}$ set as defined above and of the position of the second Hbank set as defined above.

These rates $vP_{bank}$ and $vH_{bank}$ are respectively noted.

In other control modes (the second and third control modes, for example), the at least one rate $V_{barres}$ of movement of the control clusters typically corresponds to the rate of movement of the groups of the first set.

The neutron poison or diluent fluid injection rate is typically expressed as a rate of change in the neutron poison concentration in the primary coolant denoted $u_Q$. In other cases, it is expressed in the form of a mass flow rate injected into the primary coolant, denoted $Q_{bor}$ or $Q_{dil}$.

The commands are produced by the regulation assembly 25, which transmits them to the actuators. The actuators are the drive mechanisms 9 of the clusters, and the injection circuit 15 of neutron poison or diluent fluid.

The regulation process is designed to comply with specifications, i.e. a plurality of objectives. These constraints will be described only for the first control mode.

The Core Control is constrained by an authorized operating domain in which the deviations of the operating parameters from their references must be maintained. This domain is defined by the Limiting Condition Operation (LCO), i.e. the upper and lower limits for each controlled operating parameter (namely, $T_m$, AO and $P_{bank}$) with respect to their references.

We define these references by:
$T_{m,ref}$ the average temperature reference
$AO_{ref}$ the AO reference
$P_{bank,ref}$ the position reference of the Pbank group
The deviation of the parameters to be checked against their references is given by:
$\Delta T_m$ the average temperature deviation from its reference.
$\Delta AO$ the deviation of AO from its reference.
$\Delta P_{bank}$ the position difference of Pbank from its reference.
We then define the limits of the field of operation such as:

$$\Delta T_m \in [-\Delta T_m^{max}, \Delta T_m^{max}]$$

$$\Delta AO \in [-\Delta AO^{max}, \Delta AO^{max}]$$

$$\Delta P_{bank} \in [-\Delta P_{bank}^{max}, \Delta P_{bank}^{max}]$$

Typical values given for these parameters are for example:

$$\Delta T_m^{max} = 1.5° C.$$

$$\Delta AO^{max} = 5\% AO$$

$$\Delta P_{bank}^{max} = 30 \text{ steps}$$

The Core Control must help realize the flexibility demands on the reactor, for example:
   Adaptation to the variation in daily demand (load monitoring)
   Load ramps: +5%/min PN between 25% and 100% of PN
   Adaptation to real-time demand variation (frequency control)
   Primary: ±5% PN at 1%/s
   Secondary: ±5% PNat 1%/min
   Adaptation to network disturbances (rotating reserve)
   Step: ±10% PN between 30% and 100% PN The purpose of Core Control is to keep the outputs to be controlled within the authorized operating range defined above, regardless of the power variations specified above.

The maximum authorized demands are defined as follows:
   Saturation of the control clusters in positions:
   Minimum position: $P_{barres}^{min} = 0$ steps extracted
   Maximum position: $P_{barres}^{max} = 410$ steps extracted
   Minimum speed: $V_{barres}^{max} = 4$ steps/min
   Maximum speed: $V_{barres}^{max} = 75$ steps/min
   Maximum and minimum rates of neutron poison injection/dilution:
   Min. neutron poison flow rate: $Q_{bor}^{min}$ 322 kg/s
   Max. neutron poison flow rate: $Q_{bor}^{max} = 3$ kg/s
   Min. diluent fluid flow rate: $Q_{dil}^{min} = 1$ kg/s
   Max. flow rate of diluting fluid: $Q_{dil}^{max} = 10$ kg/s
   Min. concentration: $C_b^{min} = 0$ ppm
   The regulator must have guarantees of robustness:
   Minimum modulus margin: $M_m = 0.5$ The references of the outputs to be controlled depend on the operation of the core. They are defined as follows:
   The reference temperature $T_{m,ref}$ is a function of the power of the nuclear reactor. It is read directly on a predetermined curve, as a function of the power requested from the turbine(s). Here we consider the current value of the at least one input.

The reference axial power imbalance $AO_{ref}$ is updated periodically, for example every month, to take into account the exhaustion of the core. It is supplied directly by the operator of the nuclear reactor and is considered constant between two updates.

The reference position $P_{bank,ref}$ of the Pbank sub-assembly is a function of the power of the nuclear reactor. It is read directly on a predetermined curve, as a function of the power demanded from the turbine(s). This reference position is given in cumulative position.

The method of regulating the operating parameters will now be detailed, for the first control mode.

This process was designed to take into account the fact that the control of a nuclear reactor core has specific features.

The reactor has disparate dynamics, i.e. both slow and fast. The dynamics linked to xenon are very slow (of the order of an hour) while those linked to power and temperature are rather fast (of the order of ten seconds).

Over the entire operating domain, the behavior of the core is highly non-linear, mainly due to the insertion of the cluster groups into the core. Between the maximum power (100%PN) and an intermediate power (e.g. 60%PN), the effect of the groups of clusters on the various operating parameters to be controlled changes greatly. We even observe a reversal of the effects of the actuators in certain areas of the core.

The neutron poison actuator considered in the problem of control has a significant delay: 300 seconds. Although the system that one seeks to control is relatively slow (overall order of magnitude: 10 seconds), a delay of this magnitude is significant for the regulation.

The specifications set out above contain a large number of constraints, including time constraints that it is often difficult to take into account by traditional control techniques.

Currently, each electricity production unit receives a daily load variation program. This program is therefore known in advance. However, we are not currently taking advantage of this signal to predict future commands. In the present control method, it is possible to consider the future variations of this signal for the development of the command.

To respond to the difficulties specified above, the regulation method implements a hierarchical control strategy.

The method comprises the following steps:
acquisition of the current value $D_U$, $D_P$ of the at least one input;
acquisition of the current value $Y$ of the output vector;
development of a reference value $Y_{ref}$ of the vector of the outputs, using the current value $D_U$, $D_P$ of the at least one input signal;
development of a vector $U_S$ of values of the commands of the nuclear reactor by a supervisor 31 implementing a predictive control algorithm, using at least said current value $D_U$, $D_P$ of the at least one input and the current value $Y$ of the vector of outputs;
development of a vector $u_K$ of corrective values of the nuclear reactor controls by a regulator 33 implementing a sequenced gain control algorithm, using the current value $Y$ of the vector of the outputs and the reference value $Y_{ref}$ of the vector of the outputs;
development of a vector $U$ of corrected values of the commands of the nuclear reactor, using the vector $U_S$ of the values of the commands produced by the supervisor 31 and the vector $u_K$ of corrective values of the commands produced by the regulator 33;

regulation of the operating parameters of the nuclear reactor, by controlling actuators using the vector $u_K$ of corrected values of the controls.

As described above, the at least one input is typically the power demanded from the turbine(s). This typically corresponds to the programmed power, supplied, for example, by the load monitoring program known in advance.

Alternatively, it is the real power of the turbine, denoted here $D_P$, given by the following equation: $D_P=D_u d_p$.

The at least one alternative input includes one or more of the inputs listed above, in addition to or instead of the power demanded from the turbine(s).

Advantageously, the reference value $Y_{ref}$ of the vector of the outputs is determined only from the programmed power $D_u$. The reference value $Y_{ref}$ is therefore not modified by the power variations considered to be random, i.e. given by $d_p$.

The reference value $Y_{ref}$ of the vector of the outputs is as follows:

$$Y_{ref}=(T_{c,ref} \; T_{m,ref} \; AO_{ref} \; P_{K_{ref}} \; P_{bank,ref})^T$$

$zT_{c,ref}$ is the reference hot branch temperature. It is read on a predetermined curve, giving $T_{c,ref}$ directly as a function of the current value of the at least one input.

$T_{m,ref}$, $AO_{ref}$, and $P_{bank,ref}$ are determined as described above.

$P_{K_{ref}}$ is the benchmark core power. It is considered equal to the power demanded from the turbine(s).

The vector of the corrected commands $U$, i.e. the commands given to the actuators, are obtained by adding the vector $U_S$ of the values of the commands produced by the supervisor 31 and the vector $u_K$ of the corrective values of the commands produced by the regulator 33: $U=U_S+u_K$ The current value $Y$ of the output vector is as follows:

$$Y=(T_c \; T_m \; AO \; P_K \; P_{bank})^T$$

$Y$ is obtained as described above.

The supervisor 33 considers the vector $y$ as input, defined as being the difference between the current value $Y$ of the vector of the outputs and the reference value $Y_{ref}$ of the vector of the outputs:

$$y=Y-Y_{ref}, \text{ with } y=(\delta T_c \; \delta T_m \; \delta AO \; \delta P_K \; \delta P_{bank})^T$$

The sequenced gain regulator 33 addresses the following issues:
Ensure close control of the system by ensuring good performance a priori around each operating point, in particular for the rejection of disturbances linked to frequency adjustment.
Control the reactor over the entire operating range by adapting the gains that make it up as the operation progresses.
Guarantee robustness (multi-objective approach), locally, around the operating points.
Take into account a large number of command constraints, imposed in the specifications.

Figure 4:
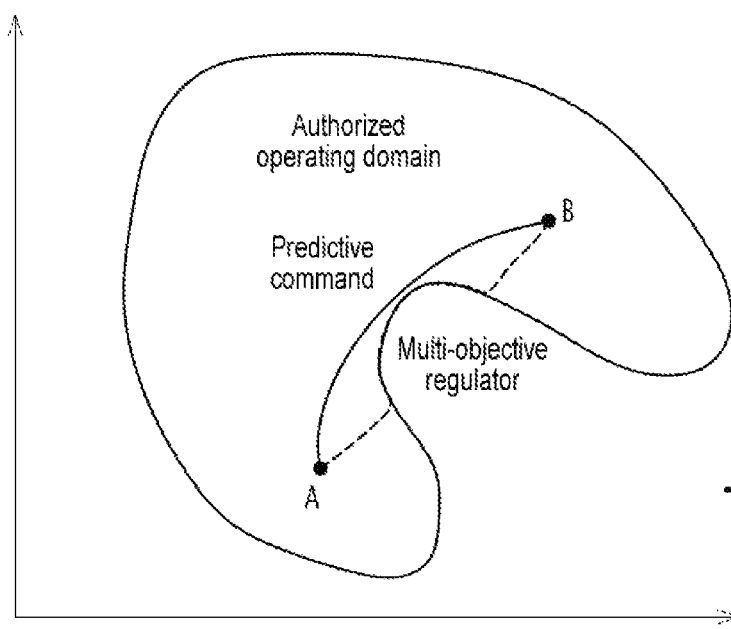
FIG. 4 schematically illustrates the difference between the sequenced gain regulator and the supervisor.

However, for systems exhibiting large non-linearities as is the case here, a sequenced gain regulator may show poor performance. In fact, it is synthesized at each operating point on the basis of a linearized model. However, the use of a linearized model may lack representativeness of the global non-linear model. The disadvantage is that the trajectories taken by this regulator may then be far from the optimal path of the overall behavior. FIG. 4 compares the path taken by a sequenced gain regulator (dotted line) to that taken by a predictive control algorithm (solid line). It illustrates the fact that the sequenced gain regulator does not take into account overall constraints for tracking the paths as would the predictive control.

The sequenced gain regulator is a structured regulator, preferably of the multivariable PI type.

The sequencing of the regulator is advantageously in the position of the first Pbank_sub-set. In other words, the regulator 31 comprises a set of linear regulators, each determined for a predetermined operating point, i.e. for a predetermined insertion position of the first Pbank set.

The nuclear reactor model used to synthesize linear regulators, also called LTI (Linear Time Invariant), is a non-linear point model, linearized around predetermined operating points. It does not model xenon. In fact, since xenon is very slow in the face of variations in other states, the multi-objective regulator will not have the task of anticipating it, this task being dedicated to the supervisor.

In addition, it is synthesized on a set of local LTI regulators. It therefore does not benefit from the good representativeness of the non-linear model for large power amplitude variations (e.g. load variations).

The supervisor 31 implements a predictive control algorithm using the same non-linear point model of the reactor as that used to synthesize the linear regulators of the regulator 33. This control technique responds to a large number of the issues mentioned above:

It combines both the ability to control the system whatever its dynamics (slow: xenon, and/or fast: temperature) by using a potentially non-linear model of the system.

It allows the taking into account of delays, even long ones, in particular the injection of neutron poison.

In addition, knowing the load monitoring program in advance, it anticipates the behavior by calculating the optimal paths given the program.

Finally, the paths of the regulator will be optimized over the overall behavior of the system and not locally as is the case for a regulator with sequenced gains alone.

However, like any finite horizon non-linear predictive control algorithm:

It does not have any robustness guarantees.

It calculates fixed commands over a defined time horizon called 'no sampling'. Depending on the calculation capacities available, the prediction horizon and the complexity of the model used, this sampling interval may be large. In this case, the supervisor does not have the capacity to adapt its commands to reject any unplanned disturbances. In fact, if these disturbances are faster than the sampling step, the supervisor, having fixed commands on this step, will not be able to adapt its commands sufficiently quickly to reject the disturbances. In this case, it is the variations in power due to the frequency setting that may pose a problem. In fact, the latter are random and fast.

Thus, a central idea of the present disclosure is to combine a predictive control algorithm and a multi-objective regulator with sequenced gains. The advantages of the one make it possible to compensate at least in part for the weaknesses of the other, as highlighted in the table below.

|  | Supervisor | Supervisor |
|---|---|---|
| Advantages | Prediction of the paths based on a non-linear model for the ramp variation<br>Anticipation of xenon + boron | Command to respect the command objectives<br>Robustness with respect to the operating points |
| Disadvantages | Commands fixed on a potentially large sampling step<br>No guarantee of robustness | Representation of the model for ramp variations<br>No xenon modelling |

Thus, the sequenced gain control algorithm of the regulator 33 comprises a plurality of linear regulators, each determined for a specific operating point of the nuclear reactor.

Said operating points being staggered to cover a power range of the nuclear reactor going from 25% to 100% of a nominal power of the nuclear reactor.

In the first control mode, each operating point is characterized by a determined insertion position $P_{bank}$ of the first set of groups, typically exclusively characterized by the position $P_{bank}$.

Alternatively, each operating point may be characterized by one or more of the physical parameters below, in addition to, or in place of, the determined insertion position $P_{bank}$ of the first set of groups:

the power level of the reactor;

the insertion position of the Hbank group;

the boron concentration;

the temperatures of the primary coolant at the inlet and outlet of the core;

the primary fluid flow.

Figure 5:
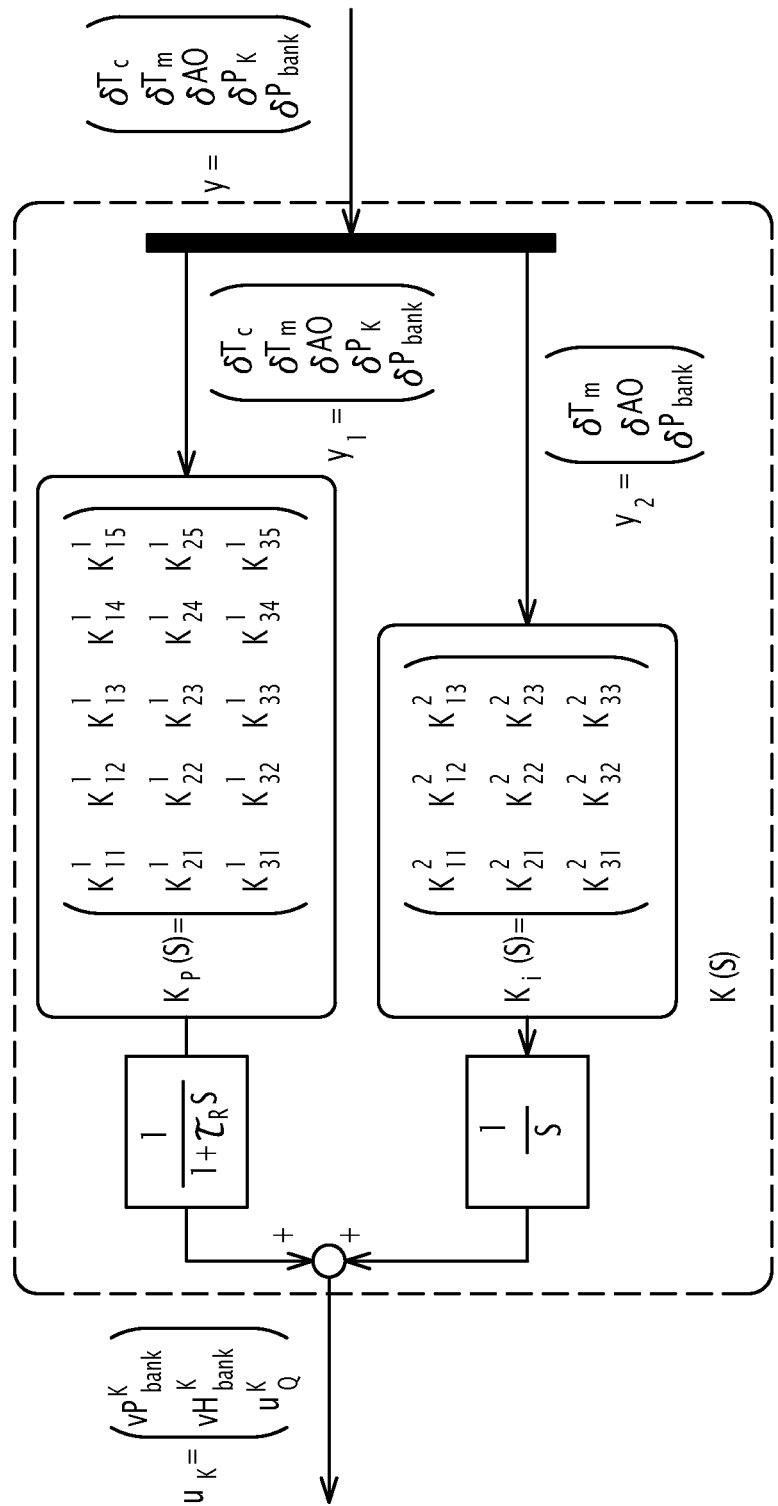
FIG. 5 is a schematic representation of the sequenced gain control algorithm.

Each linear regulator is expressed, for example, in the following form, illustrated in FIG. 5:

$$u_K = K(s) \cdot y = Kp(s)y_1 + Ki(s)y_2 \text{ with } y_1 = y \text{ and } y_2 = z$$

where $K_p$ and $K_1$ are gain matrices, s the Laplace variable, y being the output difference vector between the current value Y of the output vector and the reference value Yref of the output vector, z being an operating parameter deviation vector between the current value of the vector of operating parameters to be checked and the reference value of the vector of operating parameters to be checked, and uk being the vector of the corrective values of the commands.

The different vectors are composed as follows:

$$y = \begin{pmatrix} \delta T_c \\ \delta T_m \\ \delta AO \\ \delta P_K \\ \delta P_{bank} \end{pmatrix} \quad u_K = \begin{pmatrix} vP_{bank}^K \\ vH_{bank}^K \\ u_Q^K \end{pmatrix} \quad z = \begin{pmatrix} \delta T_m \\ \delta AO \\ \delta P_{bank} \end{pmatrix}$$

We therefore define the matrices $K_p$ and $K_1$ as follows:

$$K_P = \begin{pmatrix} k_{11}^1 & k_{12}^1 & k_{13}^1 & k_{14}^1 & k_{15}^1 \\ k_{21}^1 & k_{22}^1 & k_{23}^1 & k_{24}^1 & k_{25}^1 \\ k_{31}^1 & k_{32}^1 & k_{33}^1 & k_{34}^1 & k_{35}^1 \end{pmatrix}$$

and $$K_I = \begin{pmatrix} k_{11}^2 & k_{12}^2 & k_{13}^2 \\ k_{21}^2 & k_{22}^2 & k_{23}^2 \\ k_{31}^2 & k_{32}^2 & k_{33}^2 \end{pmatrix}$$

Figure 6:
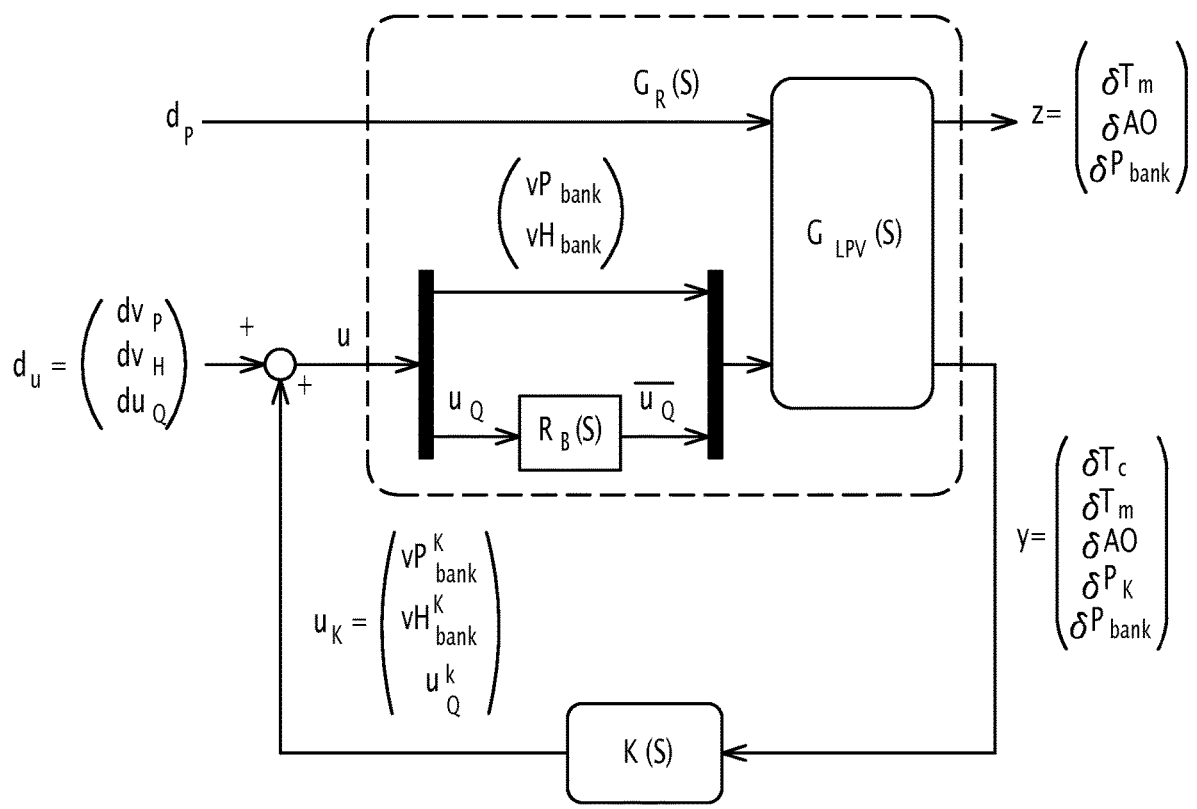
FIG. 6 is a schematic representation of a step for obtaining the linear regulators of the sequenced gain control algorithm.

The method comprises a step of obtaining linear regulators, comprising for each linear regulator the following sub-steps:

development of a linearized model of the nuclear reactor by linearization of a non-linear model of the nuclear reactor at the corresponding operating point, the linearized model relating:

the output deviation vector and the operating parameter deviation vector on the one hand, with at least one of a disturbance $d_p$ of the at least one input, a disturbance $d_U$ of the vector of corrected values of the commands, of a disturbance dy of the vector of deviation of the outputs y, and the vector $u_K$ of the corrective values of the commands on the other hand, the linearized model and the linear regulator thus forming a looped system for said insertion position (illustrated in FIG. 6);

determination of operating constraints of the nuclear reactor to be respected for predetermined disturbances dp of the at least one input or predetermined disturbances dU of the vector U of the corrected values of the commands, or of the predetermined disturbances dy of the deviation vector of the outputs y;

translation of each operating constraint into a digital condition to be respected for a transfer function between:

the disturbance dp of at least one input $D_U$, or the disturbance dU of the corrected command vector U, or the disturbance dy of the deviation vector of the outputs y, on the one hand, and either the difference between the current value of one of the operating parameters and the reference value of said operating parameter, or the difference between the current value of one of the outputs and the reference value of said output, or one of the corrective values of the commands, on the other hand;

determination of the gains of the gain matrices $K_p$ and $K_1$, said gains being determined by an optimization algorithm so as to stabilize at least the looped system for the corresponding insertion position and to satisfy the digital conditions corresponding to all the operating constraints.

The optimization algorithm is typically non-smooth.

The non-linear model of the nuclear reactor is as follows:

$$\frac{dT_c}{dt}(t) = -\frac{1}{\tau_{co}}T_c(t) + \frac{1}{\tau_{co}}T_f(t) + \frac{1}{\tau_{co}}\frac{K_n}{Q_p C_p}n(t)$$

$$\frac{dT_f}{dt}(t) = -\frac{1}{\tau_{bf}}T_f(t) + \frac{1}{\tau_{bf}}T_f^{GV}(t)$$

$$\frac{dAO}{dt}(t) = -\frac{1}{\tau_{AO}}AO(t) + \frac{1}{\tau_{AO}}\left(K_{AO}^c T_c(t) + K_{AO}^f T_f(t) + K_{AO}^p P_b(t) + K_{AO}^H H_b(t)\right)$$

$$\frac{d\rho_{dop}}{dt}(t) = -\frac{1}{\tau_{dop}}\rho_{dop}(t) + \frac{K_{dop}}{\tau_{dop}}n(t)$$

$$\frac{dn}{dt}(t) = \frac{\rho(t)-\beta}{l^*}n(t) + \lambda c(t)$$

$$\frac{dc}{dt}(t) = \frac{\beta}{l^*}n(t) - \lambda c(t)$$

$$\frac{dT_c^{GV}}{dt}(t) = -\frac{1}{\tau_{bc}}T_c^{GV}(t) + \frac{1}{\tau_{bc}}T_c(t)$$

$$\frac{dT_c^{GV}}{dt}(t) = -\frac{1}{\tau_{GV}}T_c^{GV}(t) + \frac{1}{\tau_{GV}}T_f^{GV}(t) + \frac{1}{\tau_{GV}}\frac{P_{turb}(t)}{Q_p C_p}$$

$$\frac{dI}{dt}(t) = \gamma_I n(t) - \lambda_I I(t)$$

$$\frac{dXe}{dt}(t) = \Gamma_{Xe}n(t) + \lambda_I I(t) - (\lambda_{Xe} + \sigma_{Xe}n(t))Xe(t)$$

$$\rho(t) = \rho_{dop}(t) + \rho_{barres}(t) + \rho_{mod}(t) + \rho_{bore}(t) + \rho_{Xe}(t)$$

$$\rho_{mod}(t) = K_c(T_c(t) - T_c^i) + K_f(T_f(t) - T_f^i)$$

$$\rho_{barres}(t) = K_P(P_b(t) - P_b^i) + K_H(H_b(t) - H_b^i)$$

$$\rho_{bore}(t) = K_{CB}(C_b(t) - C_b^i)$$

$$\frac{dP_b}{dt}(t) = \nu P_{bank}$$

$$\frac{dH_b}{dt}(t) = \nu H_{bank}$$

$$\frac{dC_b}{dt}(t) = \overline{u_Q}$$

where $x = (T_h \; T_c \; AO \; \rho_{dop} \; n \; c \; T_c^{GV} \; T_f^{GV} \; P_{GV} \; P_{bank} \; H_{bank} \; C_b)^T$ $u = (\nu P_{bank} \; \nu H_{bank} \; \overline{u_Q})^T$ and $d = P_{turb}$ The delay on the neutron poison is expressed by the following relation:

$\overline{u}_U(t) = u_Q(t-h_{bore})$, where $h_{bore}$ is a delay constant.

$\tau_{AO}$ AO time constant
$\tau_{bc}$ Hot branch time constant
$\tau_{bf}$ Cold branch time constant
$\tau_{co}$ Core time constant
$\tau_{GV}$ GV time constant
c Concentration of precursors in the core
$C_b$ Boron concentration
$C_P$ Specific heat capacity of the water in the primary circuit
$K_n$ Power conversion coefficient
n Neutron density in the core
$Q_P$ Primary circuit water flow
$T_c^{GV}$ Hot branch temperature at the GV
$T_f^{GV}$ Cold branch temperature at the GV level
$\overline{u_Q}$ Delayed boron control
$\rho$ Reactivity
$K_{AO}^c \; K_{AO}^f \; K_{AO}^P \; K_{AO}^H \; K_{dop} \; K_c \; K_f \; K_P \; K_H \; K_{CB}$ are coefficients which vary according to the state of the core and introduce non-linearities.

The linearization is carried out according to any suitable method, for example by carrying out a Taylor expansion of the equations comprising non-linearities around the operating points in question.

The linearized model around an operating point looks like this:

$$\frac{d\delta T_c}{dt}(t) = -\frac{1}{\tau_{co}}\delta T_c(t) + \frac{1}{\tau_{co}}\delta T_f(t) + \frac{1}{\tau_{co}}\frac{K_n}{Q_p C_p}\delta n(t)$$

$$\frac{d\delta T_f}{dt}(t) = -\frac{1}{\tau_{bf}}\delta T_f(t) + \frac{1}{\tau_{bf}}\delta T_f^{GV}(t)$$

$$\frac{d\delta AO}{dt}(t) =$$

$$-\frac{1}{\tau_{AO}}\delta AO(t) + \frac{1}{\tau_{AO}}\left(K_{AO}^c \delta T_c(t) + K_{AO}^f \delta T_f(t) + K_{AO}^p \delta P_b(t) + K_{AO}^H \delta H_b(t)\right)$$

$$\frac{d\delta \rho_{dop}}{dt}(t) = -\frac{1}{\tau_{dop}}\delta \rho_{dop}(t) + \frac{K_{dop}}{\tau_{dop}}\delta n(t)$$

-continued $$\frac{d\delta n}{dt}(t) = \frac{n^0}{l^*}\rho(t) - \frac{\beta}{l^*}\delta n(t) + \lambda\delta c(t)$$

$$\frac{d\delta c}{dt}(t) = \frac{\beta}{l^*}\delta n(t) - \lambda\delta c(t)$$

$$\frac{d\delta T_c^{GV}}{dt}(t) = -\frac{1}{\tau_{bc}}\delta T_c^{GV}(t) + \frac{1}{\tau_{bc}}\delta T_c(t)$$

$$\frac{d\delta T_c^{GV}}{dt}(t) = -\frac{1}{\tau_{GV}}\delta T_c^{GV}(t) + \frac{1}{\tau_{GV}}\delta T_f^{GV}(t) + \frac{1}{\tau_{GV}}\frac{\delta P_{turb}(t)}{Q_p C_p}$$

$$\rho(t) = \rho_{dop}(t) + \rho_{barres}(t) + \rho_{mod}(t) + \rho_{bore}(t) + \rho_{Xe}(t)$$

$$\rho_{mod}(t) = K_c\delta T_c(t) + K_f\delta T_f(t)$$

$$\rho_{barres}(t) = K_P\delta P_b(t) + K_H\delta H_b(t)$$

$$\rho_{bore}(t) = K_{CB}\delta C_b(t)$$

$$\delta P_K(t) = K_n \cdot \delta n(t)$$

$$\frac{d\delta P_b}{dt}(t) = vP_{bank}$$

$$\frac{d\delta H_b}{dt}(t) = vH_{bank}$$

$$\frac{d\delta C_b}{dt}(t) = \overline{u_Q}$$

with the coefficients in bold identified at each operating point.

These equations constitute the $G_{LPV}$ model shown in FIG. 6.

We approximate the neutron poison injection delay by a Laguerre approximant defined as follows:

$$\overline{u_Q} = R_B(s) \cdot u_Q \text{ avec } R_B(s) = \frac{\left(1 - \frac{h}{2n}s\right)^n}{\left(1 + \frac{h}{2n}s\right)^n}$$

where s is the Laplace variable; h is the value of the delay; n is an integer, h is typically between 100 and 500 seconds, preferably between 200 and 400 seconds, and may be, for example, 300 seconds, n is typically between 3 and 15 and may be chosen, for example, equal to 9.

Combined with the $_{LPV}$ model $G_{LPV}$, these equations constitute the model $G_R$ of FIG. 6, i.e. the linearized model of the nuclear reactor at the operating point in question.

The $G_{LPV}$ model ma be expressed in the following form:

$$G_{LPV} := \begin{cases} \dot{x}(t) = A(\pi)x(t) + B_1 d(t) + B_2 u(t) \\ z(t) = C_1 x(t) + D_{11} d(t) + D_{12} u(t) \\ y(t) = C_2 x(t) + D_{21} d(t) + D_{22} u(t) \end{cases}$$

With $A(\pi) = \begin{pmatrix} -\frac{1}{\tau_{co}} & \frac{1}{\tau_{co}} & 0 & 0 & \frac{K_n}{C_p Q_n \tau_{co}} & 0 & 0 & 0 & 0 & 0 & 0 \\ 0 & -\frac{1}{\tau_{bf}} & 0 & 0 & 0 & 0 & 0 & \frac{1}{\tau_{bf}} & 0 & 0 & 0 \\ \frac{K_{AO}^c}{\tau_{AO}} & \frac{K_{AO}^f}{\tau_{AO}} & -\frac{1}{\tau_{AO}} & 0 & 0 & 0 & 0 & 0 & \frac{K_{AO}^P}{\tau_{AO}} & \frac{K_{AO}^H}{\tau_{AO}} & 0 \\ 0 & 0 & 0 & -\frac{1}{\tau_{dop}} & \frac{K_{dop}}{\tau_{dop}n^0} & 0 & 0 & 0 & 0 & 0 & 0 \\ \frac{K_c n^0}{l^*} & \frac{K_f n^0}{l^*} & 0 & \frac{n^0}{l^*} & -\frac{\beta}{l^*} & \lambda & 0 & 0 & K_P\frac{n^0}{l^*} & K_H\frac{n^0}{l^*} & K_{CB}\frac{n^0}{l^*} \\ 0 & 0 & 0 & 0 & \frac{\beta}{l^*} & -\lambda & 0 & 0 & 0 & 0 & \square \\ \frac{1}{\tau_{bc}} & 0 & 0 & 0 & 0 & 0 & -\frac{1}{\tau_{bc}} & 0 & 0 & 0 & \square \\ 0 & 0 & 0 & 0 & 0 & 0 & \frac{1}{\tau_{GV}} & -\frac{1}{\tau_{GV}} & 0 & 0 & 0 \\ 0 & 0 & 0 & 0 & 0 & 0 & 0 & 0 & 0 & 0 & 0 \\ 0 & 0 & 0 & 0 & 0 & 0 & 0 & 0 & 0 & 0 & 0 \\ 0 & 0 & 0 & 0 & 0 & 0 & 0 & 0 & 0 & 0 & 0 \end{pmatrix}$ $$B_1(\pi) = B_1 = \begin{pmatrix} 0 \\ 0 \\ 0 \\ 0 \\ 0 \\ 0 \\ 0 \\ 0 \\ 1 \\ 0 \\ 0 \\ 0 \end{pmatrix} \quad B_2(\pi) = B_2 = \begin{pmatrix} 0 & 0 & 0 \\ 0 & 0 & 0 \\ 0 & 0 & 0 \\ 0 & 0 & 0 \\ 0 & 0 & 0 \\ 0 & 0 & 0 \\ 0 & 0 & 0 \\ 0 & 0 & 0 \\ 0 & 0 & 0 \\ 1 & 0 & 0 \\ 0 & 1 & 0 \\ 0 & 0 & 1 \end{pmatrix}$$

-continued $$C_1(\pi) = C_1 = \begin{pmatrix} \frac{1}{2} & \frac{1}{2} & 0 & 0 & 0 & 0 & 0 & 0 & 0 & 0 \\ 0 & 0 & 1 & 0 & 0 & 0 & 0 & 0 & 0 & 0 \\ 0 & 0 & 0 & 0 & 0 & 0 & 0 & 1 & 0 & 0 \end{pmatrix}$$

$$C_2(\pi) = C_2 = \begin{pmatrix} 1 & 0 & 0 & 0 & 0 & 0 & 0 & 0 & 0 & 0 \\ \frac{1}{2} & \frac{1}{2} & 0 & 0 & 0 & 0 & 0 & 0 & 0 & 0 \\ 0 & 0 & 1 & 0 & 0 & 0 & 0 & 0 & 0 & 0 \\ 0 & 0 & 0 & 0 & K_n & 0 & 0 & 0 & 0 & 0 \\ 0 & 0 & 0 & 0 & 0 & 0 & 0 & 1 & 0 & 0 \end{pmatrix}$$

$$D_{11}(\pi) = D_{11} = \vartheta_{3\times 1}$$

$$D_{21}(\pi) = D_{21} = \vartheta_{3\times 1}$$

$$D_{12}(\pi) = D_{12} = \vartheta_{5\times 3} \quad D_{22}(\pi) = D_{22} = \vartheta_{5\times 3}$$

with the state x is defined by $$x = (T_c \; T_f \; AO \; \rho_{dop} \; n \; c \; T_c^{GV} \; T_f^{GV} \; P_{bank} \; H_{bank} \; C_b)$$

the input vector is defined by $$u = (vP_{bank} \; vH_{bank} \; u_Q)^T$$

the disturbance vector is defined by $d = P_{turb}$.

The disturbances and the constraints to be repected are those of the specifications, defined above.

The translation of the operating constraints into digital conditions that may be used to determine the gain matrices involves, in particular, translating a time constraint into a frequency constraint. To do this, we seek an approximant of the maximum amplitude of an output signal y of a transfer function $$T_{y \to d}(s) = \frac{y(s)}{d(s)}$$

in response to a known demand. We then use the norm $H_\infty$ of the transfer $T_{y \to d}$, characterizing the worst case gain thereof. From this gain, the maximum amplitude of the output signal is characterized as a function of the amplitude of the square wave signal for a defined stabilized initial state.

Usually, taking into account temporal criteria is a difficult issue for control problems. In the present case, it is a major constraint of the control problem. The specifications specify certain time constraints that must be respected. For example, in any scenario, the average temperature should not exceed 1.5° C. i.e. $\forall t, |\delta T_m| 1.5°$ C.

In the present disclosure, the maximum overshoot of certain parameters is characterized under a known demand, considering a stabilized initial state. The possible demands are given by the specifications: ramps at 5%PN/min, frequency adjustment or even power step up to 10%PN. According to Framatome's expertise, the most penalizing scenario (the one which constrains the regulation the most) is a power step demanded from the turbine(s) of ±P% of a nominal power PN of the nuclear reactor, P being between 5 and 15%, P being for example 10%.

The assumption is therefore made here that if the looped system respects the specifications for the scenario: power step of P%PN, it respects the control objectives in all the cases in question.

Figure 7:
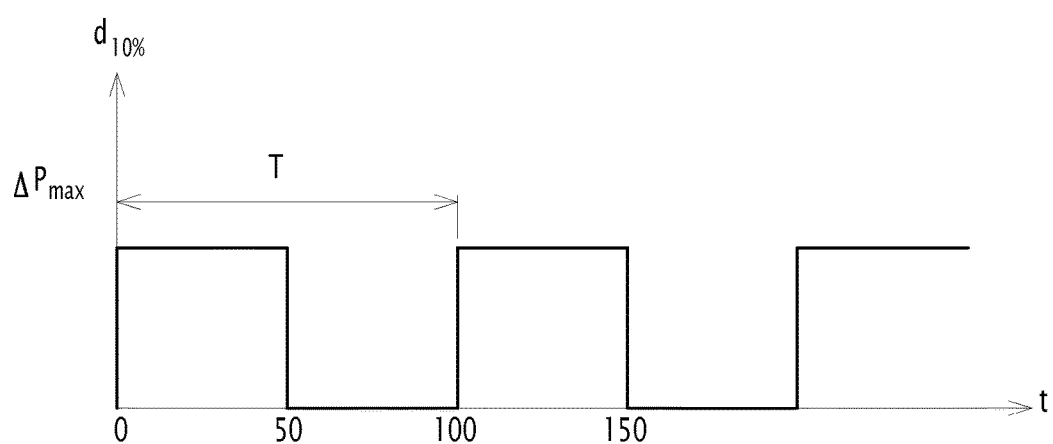
FIG. 7 is a graphical representation of a stepped disturbance signal used for the step of obtaining the linear regulators of FIG. 6.

Let us consider an excitation signal $d_{P\%}$, the signal representing the most penalizing case (power step of P%). This signal is approximated by a square wave signal of period T and amplitude $\Delta P_{max} = P\%PN$, assumed to be sufficiently representative of the square wave. Such a signal has been shown in FIG. 7, for a power step of 10%PN with T=100 seconds.

Let us break down the Fourier series signal $d_{P\%}$, denoted s. We obtain the known result for a following niche:

$$s(t) = \frac{2\Delta P_{max}}{\pi} \cdot \sum_{n=0}^{\infty} \frac{\sin((2n+1)wt)}{2n+1}$$

with $w = \frac{2\pi}{T}$ and $\Delta P_{max}$ the amplitude of the signal. In order to simplify, we will limit the study to the first three harmonics of the signal supposed to be sufficiently representative. Let s be the Fourier decomposition at the third harmonic. We then have:

$$s(t) = \Delta P_{max}\left(\frac{1}{2} + \frac{2}{\pi}\sin(wt) + \frac{2}{3\pi}\sin(3wt) + \frac{2}{5\pi}\sin(5wt)\right)$$

Assuming a zero initial state (y(t=0)=0), the amplitude of the output signal y is equal to the sum of the amplitudes of the harmonics multiplied by the gain of the transfer evaluated at the pulse of each harmonic.

The maximum amplification of the input signal s by the worst-case transfer function provides a good approximant of the maximum amplitude $y_{max}$ of the output signal y. We then have:

$$\|T_{y \to d}\|_\infty \times s_{max} \sim y_{max}$$

with $s_{max}$ the maximum amplitude of s. Now, since is the Fourier series decomposition of the signal $d_{P\%}$, we have $s \sim d_{P\%}$ and it follows that: $s_{max} \Delta P_{max}$. Since we are looking for $D_{max}$ so that $y_{max} \leq D_{max}$, we find:

$$\|T_{y \to d}\|_\infty \times \Delta P_{max} \leq D_{max}$$

This equation is used subsequently for the expression of the various criteria reflecting the constraints on the command. It is thanks to this that we reformulate the requirements in mathematical criteria.

| | |
|---|---|
| To be robust to at least a modulus margin of 0.5 | $\|W_R \cdot T_{u \to d_u}\|_\infty \leq 1$ |
| The rate of movement of the clusters is less than $V_{barres}^{max}$ | $\|W_K \cdot T_{Vbarres \to dp}\|_\infty \leq 1$, |

-continued

| The variation in neutron poison concentration is less than $u_Q^{max}$ | $\|W_Q \cdot T_{u_Q \to dp}\|_\infty \leq 1$ |
| The difference $\delta T_m$ between the current value of $T_m$ and the reference value $T_{m,\ ref}$ is between $-\Delta T_m^{max}$ et $+\Delta T_m^{max}$ | $\|W_{T_m} \cdot T_{\delta T_m \to dp}\|_\infty \leq 1$ |
| The difference $\delta AO$ between the current value of AO and the reference value $AO_{ref}$ is between $-\Delta AO^{max}$ et $\Delta AO^{max}$ | $\|W_{AO} \cdot T_{\delta AO \to dp}\|_\infty \leq 1$ |

Where $T_{u \to d_u}$ is the transfer function between the perturbation of the vector of the values of the commands dU and the vector of the corrected values of the commands U;
$d_u = (dv_P\ dv_H\ du_Q)^T$ is the disturbance of the vector of command values and $u = (vP_{bank}\ vH_{bank}\ u_Q)^T$ the vector of corrected command values;
$W_R$ is the target modulus margin, this value being predetermined and, for example, equal to 0.5;
$T_{\delta T_m \to dp}$ is the transfer function between said power step and $\delta T_m$, with $$W_{T_m} = \frac{\Delta T_m^{max}}{\Delta P_{max}},$$

$\Delta P_{max} = P\% \cdot PN;$
where $T_{\delta AO \to dp}$ is the transfer function between said power step and $\delta AO$, with $$W_{AO} = \frac{\Delta AO^{max}}{\Delta P_{max}},$$

$\Delta P_{max} = P\% \cdot PN;$
where $T_{Vbarres \to dp}$ is the transfer function between said power step and the rate of movement of the clusters, with $$W_K = \frac{V_{barres}^{max}}{\Delta P_{max}};$$

where $T_{u_Q \to dp}$ is the transfer function between said power step and the neutron poison injection rate, with $$W_Q = \frac{u_Q^{max}}{\Delta P_{max}}.$$

The following operating constraint is preferably also taken into account to obtain the linear regulator:
a disturbance dp which is a power step demanded from the turbine(s) of $\pm P\%$ of a nominal power PN of the nuclear reactor, P being between 5 and 15%, causes a minimum variation of the operating parameters.
Said constraint is translated into the following numerical condition:

$$-\min_{K \in \Omega} \|W_z \cdot T_{z \to dp}\|_2,$$

where K denotes the gain matrices $K_p$ and $K_i$, $\Omega$ denotes the set of gain matrices stabilizing the looped system, $T_{z \to dp}$ is the transfer function between said power step dp and the vector z is the operating parameter deviation, $W_z$ is a predetermined frequency weighting matrix.

As specified above, $z = (\delta T_m\ \delta AO\ \delta P_{bank})^T$ is the vector of variation of the operating parameters to be controlled.

Typically, $W_z$ the frequency weighting matrix is defined by:

$$W_Z(s) = \begin{pmatrix} W_{Z_1}(s) & 0 & 0 \\ 0 & W_{Z_2}(s) & 0 \\ 0 & 0 & W_{Z_3}(s) \end{pmatrix}$$

The weightings chosen for each channel are defined by:
$W_{z_1}$: frequency weighting for the average temperature output
$W_{z_2}$: frequency weighting for the AO output
$W_{z_3}$: frequency weighting for the position output of Pbank
They are defined as follows:

$$W_{Z_1}(s) = \frac{K_1}{s} \cdot \frac{\tau_1 s + 1}{\tau_2 s + 1} \cdot \frac{1}{\tau_3 s + 1};\ W_{Z_2}(s) = \frac{K_2}{s};\ W_{Z_3}(s) = \frac{K_3}{s}$$

where K1, K2, K3, $\tau 1$, $\tau 2$ and $\tau 3$ are predetermined coefficients.

In the equations above, $\|\ \|_\infty$ symbolizes the $H_\infty$ norm, while $\|\ \|_2$ symbolizes the $H_2$ norm. These normes are defined, for example, in J. M. Maciejowski. *Multivariable Feedback Design*. Addison-Wesley, 1989.

At least for the first control mode, the following operating constraint is taken into account to obtain the linear regulator
the difference $\delta P_{bank}$ between the current value $P_{bank}$ and the reference value $P_{bank,ref}$ is between $-\Delta P_{bank}^{max}$ and $\Delta P_{bank}^{max}$.

Said operating constraint is translated into the following digital condition:
$\|W_P \cdot T_{\delta P_{bank} \to dp}\|_\infty \leq 1$, where $T_{\delta P_{bank} \to dp}$ is the transfer function between said power step and $\delta P_{bank}$, with $$W_P = \frac{\Delta P_{bank}^{max}}{\Delta P_{max}},$$

$\Delta P_{max} = P\% \cdot PN$
Furthermore, in the first control mode, the operating constraint for the rate of movement of the clusters is $$\|W_P \cdot T_{\delta P_{bank} \to dp}\|_\infty \leq 1,\ \text{where}\ T_{\binom{vP_{bank}}{vH_{bank}} \to dp}$$

is the transfer function between said power step and rate of movement of the sets Pbank and Hbank, with $$W_K = \frac{V_{barres}^{max}}{\Delta P_{max}}.$$

The determination of the gains of the gain matrices $K_p$ and $K_1$ is performed using a non-smooth optimization method, well suited to solving control issues. The tool used is for example Systune from Matlab. This tool has a complete integrated environment making it possible to express the constraints $H_2$ and $H_\infty$ as described above.

Figure 8:
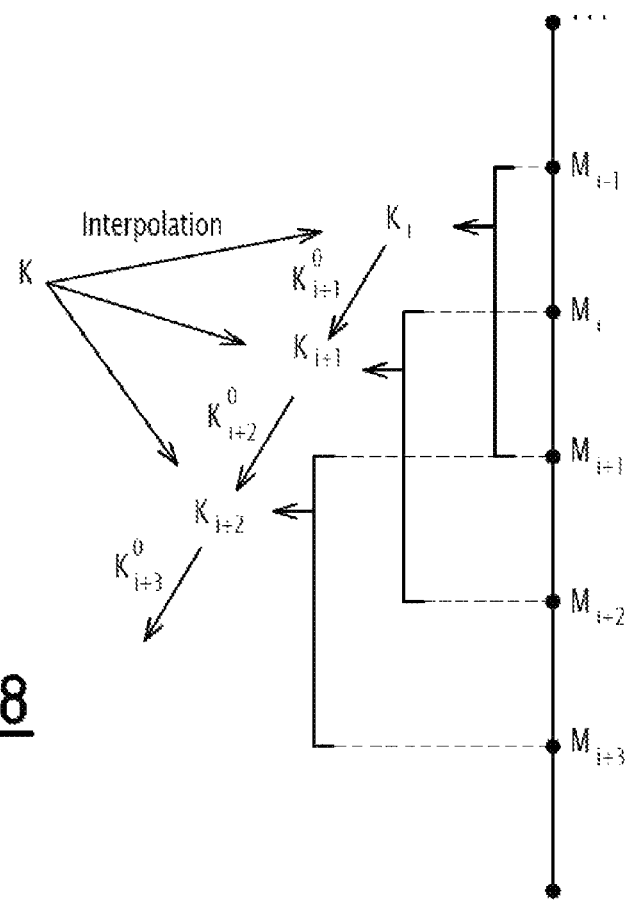
FIG. 8 is a schematic representation illustrating an alternative embodiment in which the linear regulators are determined by zone.

According to an advantageous variant, at a determined Pbank insertion position, the gains of the gain matrices $K_p$ and $K_1$ are determined by the optimization algorithm so as to stabilize the looped system for said determined insertion positions, while stabilizing the looped systems for at least the two neighboring determined insertion positions, and while satisfying the digital conditions corresponding to all the operating constraints (see FIG. 8).

For example, the gains of the gain matrices $K_p$ and $K_1$ are determined by the optimization algorithm so as to stabilize the looped system for said determined insertion position, and to stabilize the looped systems for the four positions of determined insertion adjacent to the determined insertion position, on each side thereof.

In fact, the interpolation of LTI regulators synthesized at different operating points may pose certain difficulties, in particular when the synthesis of two regulators with two neighboring operating points does not provide regulators sufficiently close to one another. In this case, the regulator interpolated between these two operating points does not necessarily constitute a viable solution, either because it may lead to instability, or else it induces too sudden transients when the coefficients are changed.

To solve this problem, the determination of the gains at a given operating point consists of a multi-model approach by zone, as indicated above. The resulting regulator will check the constraints and will be optimal for all the models in question.

In addition, the controller optimized at one operating point is used to initiate optimization at the neighboring operating point.

Finally, the variation of the coefficients of the regulator matrices is constrained, so as to keep its coefficients sufficiently close to those of the initial regulator (i.e. the neighboring regulator).

The regulator 33 alone, for a scenario corresponding to a power ramp from 100%PN to 60%PN at 5%PN/min, makes it possible to obtain the following performances:

$|\Delta T_m^{max}|=0.56°$ C.$\leq 1.5°$ C.;
$|\Delta AO^{max}|=5.06\%AO\sim 5\%AO$; $|\Delta P_{bank}^{max}|=14.3$ $PE \leq 30$ $PE$ These performances are correct for Tm and Pbank, but are at the authorized limit for AO.

The supervisor 31 will now be described.

The model used for the supervisor is the non-linear model described above. The interests of this model are that:
The effect of xenon is modeled.
The real delay of boron is modeled.
More precision than the linearized model.
The model equations are given above. We then define the model used by the supervisor as follows:

$\dot{x}_S = F_S(x_S, U_S)$ $y_S = G_S(x_S, U_S)$ with $x_S$ the state, $U_S$ the signal of the reference commands calculated by the supervisor, $y_S$ the outputs, $F_S$ and $G_S$ the functions defining the development of the state and the output as a function of the inputs and the state. Using the same notations as before, we have:)

$x_S = (T_h\ T_c\ AO\ \rho_{dop}\ n\ c\ T_c^{GV}\ T_f^{GV}\ P_{bank}\ H_{bank}\ C_b)^T$ $y_S = (T_c\ T_m\ AO\ P_K\ P_{bank})^T$ and $U_S = (VP_{bank}\ VH_{bank}\ U_Q)^T$ with $VP_{bank}$, $VH_{bank}$ and $U_Q$ the reference commands for each actuator calculated by the supervisor.

Unlike the linearized model which uses a Laguerre approximation to represent the neutron poison delay, the latter is considered this time as follows:

$\forall t,\ \overline{U_Q}(t) = U_Q(t - h_{bore})$ where $U_Q$ denotes the neutron poison control and $h_{bore}$ the neutron poison delay. For example, the delay may be 300 seconds.

Typically, the following parameters are chosen for the supervisor setting:
Sampling step: $T_S = 100$ (seconds)
Prediction horizon: $N_p = 10$
Command horizon: $N_c = 9$ We define by $U_S^j$ the vector of the orders on the step j (i.e. with time $j \cdot T_S$) calculated by the algorithm of optimization such that:

$\forall j \geq 1,\ U_S^j = (VP_{bank}^j\ VH_{bank}^j\ U_Q^j)^T$

The base of functions used for the commands is the base of the piecewise constant functions. This means that the commands will be constant over the sampling period, and discontinuous from one sampling step to the next.

At each sampling step, the supervisor optimizes $N_c$ values, defining the commands on each channel (Pbank, Hbank and boron flow). We set $\overline{U_S}$ the matrix of the commands calculated with the step of sampling such that:

$\overline{U_S} = [U_S^j\ \ldots\ U_S^{j+N_c-1}]^T$

At each sampling step, we will therefore have:

$$\overline{U_S} = \begin{bmatrix} VP_{bank}^j & \ldots & VP_{bank}^{j+N_p} \\ VH_{bank}^j & \ldots & VH_{bank}^{j+N_p} \\ U_Q^j & \ldots & U_Q^{j+N_p} \end{bmatrix}^T$$

The set of coefficients of the matrix $\overline{U_S}$ therefore correspond to the optimization decision variables. Finally, at each sampling step j, the first noted computed command $U_S^j$ is then applied. Then, the control signal applied to the process, denoted $U_S$, evolves continuously according to the following relation:

$\forall t \in [j \cdot T_S,\ (j+1) \cdot T_S[,\ U_S(t) = U_S^k$

The objective function in question for the supervisor is based on the performance objectives defined above. The goal of the supervisor will be to calculate the reference commands for the Pbank, Hbank and neutron poison actuators, minimizing the deviation of the parameters to be checked from their respective references.

The parameters to be checked are the same as regulator 33:
The average temperature noted $T_m$.
The axial power distribution denoted AO.
The position of the first Pbank subset denoted $P_{bank}$
The references of these parameters are given by $T_{m,ref}$, $AO_{ref}$ et $P_{bank,ref}$. We then set $\delta T_m$, $\delta AO$ and $\delta P_{bank}$ the deviations from the respective references of the parameters to be checked such that:

$\delta T_m = T_m - T_{m,ref}$ $\delta AO = AO - AO_{ref}$ $\delta P_{bank} = P_{bank} - P_{bank,ref}$ The objective function is constructed as follows:

$J = J_U + J_Z$

We define here $\|f\|_{2,[a,b]} = \sqrt{\int_a^b |f(t)|^2 dt}$

To simplify writing, we denote $\|f\|_2 = \|f\|_{2,[0,N_P \cdot T_S]}$

The criterion for the control $J_Z$ is then defined as follows:

$$J_Z = K_{T_m} \|\delta T_m\|_2 + K_{AO} \|\delta AO\|_2 + K_{P_{bank}} \|\delta P_{bank}\|_2$$

And the criterion is defined as follows:

$$i \cdot J_U = K_{P_{bank}} \cdot \|VP_{bank}^f\|_2 + K_{H_{bank}} \cdot \|VH_{bank}^f\|_2 + K_Q \cdot \|\overline{U_Q^f}\|_2$$

With $K_{P_{bank}}$, $K_{H_{bank}}$ and $K_Q$ the weightings and $P_{bank}^f$, $VH_{bank}^f$ and $\overline{U_Q^f}$ the filtered command inputs. The latter are filtered so as to penalize the high frequencies. We then define the high pass filter on the commands, and the filtered signals:

$$VP_{bank}^f = H_U(s) \cdot VP_{bank}$$

$$VH_{bank}^f = H_U(s) \cdot VH_{bank}$$

$$\overline{U_Q^f} = H_U(s) \cdot \overline{U_Q}$$

With:

$$H_U(s) = \frac{K_U s}{1 + \tau_U s}$$

The criterion defined by the equations above, translated in the discrete field, with $\overline{U_S}$ the matrix of the commands defined above, is expressed in the following form:

$$J(\overline{U_S}) = \Sigma_{i=j+1}^{j+N_P} [\delta T_m(i \cdot T_S)^2 + \delta AO(i \cdot T_S)^2 + \delta P_{bank}(i \cdot T_S)^2 + VP_{bank}^f(i \cdot T_S)^2 + VH_{bank}^f(i \cdot T_S)^2 + U_Q^f(i \cdot T_S)^2]$$

In addition, we will denote $z_S^j$ the vector of the deviations of the outputs to be checked, evaluated at the sampling step (i.e. at time $j \cdot T_S$), in the discrete domain, such that:

$$z_S^j = [\delta T_m(j \cdot T_S) \; \delta AO(j \cdot T_S) \; \delta P_{bank}(j \cdot T_S)]^T$$

The constraints imposed on the supervisor, through the command issue, arise from the requirements formulated in the specifications concerning the demands upon command. The interest of the supervisor 31, compared to the regulator 33 is that it has the capacity to explicitly take into account formal time constraints, whether they relate to the inputs or to the state variables: here the position constraints and maximum speed of the groups of clusters as well as the maximum flow rates of dilution/borication.

We then formulate the following constraints, deduced from the specifications:

$$\begin{cases} VP_{bank} < 1.25 \, (\text{pas/s}) \\ VP_{bank} > -1.25 \, (\text{pas/s}) \\ VH_{bank} < 1.25 \, (\text{pas/s}) \\ VH_{bank} > -1.25 \, (\text{pas/s}) \\ U_Q < 2.7 \cdot 10^{-2} \, (\text{ppm/s}) \\ U_Q > -4.7 \cdot 10^{-3} \, (\text{ppm/s}) \\ P_{bank} < 1053 \, (\text{pas}) \\ P_{bank} > 0 \, (\text{pas}) \\ H_{bank} < 410 \, (\text{pas}) \\ H_{bank} > 9 \, (\text{pas}) \\ C_b > 0 \, (\text{ppm}) \end{cases}$$

A predictive control algorithm used in the present disclosure is as follows.

The model used to calculate the outputs of the model according to the commands (the decision variables), is a non-linear model. Given the constraints and the objective function defined previously, a non-linear under-constrained optimization algorithm is required for the resolution of such a problem. For example, a non-linear under-constrained optimization algorithm based on the interior point method is used, and as implemented by the function fmincon of Matlab.

Figure 9:
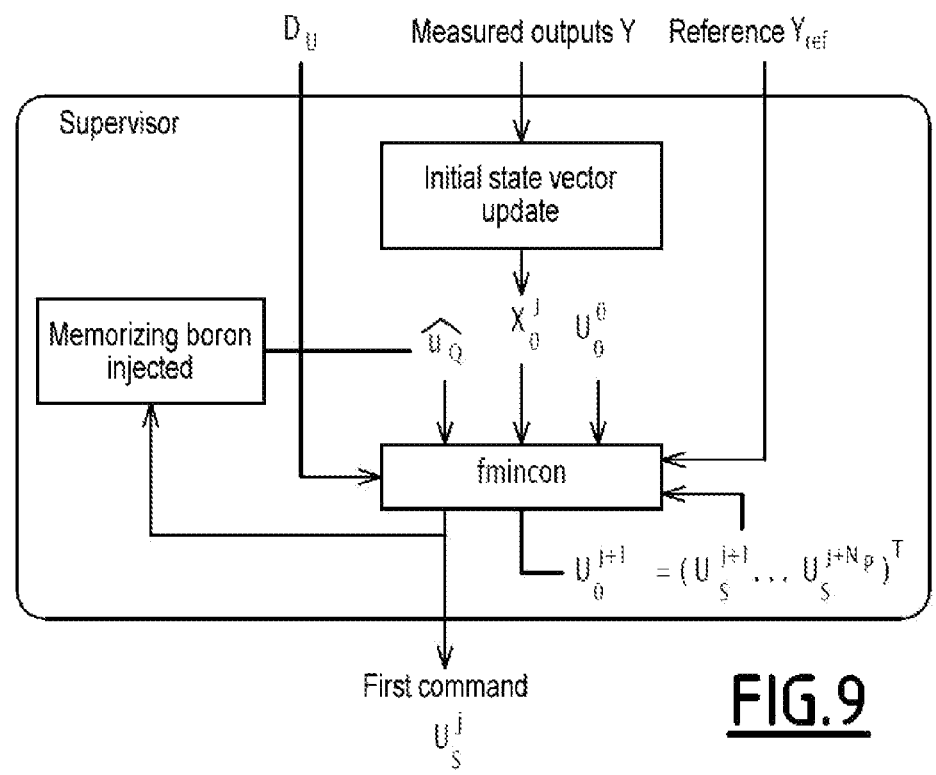
FIG. 9 is a schematic representation of the supervisor.

The supervisor algorithm is presented in the form of a principle diagram in FIG. 9. This figure gives an account of the different functions which are implemented as well as the information flows which they exchange at each sampling step.

At each sampling step, the supervisor receives the measurements Y from the system, the references $Z_{ref}$ of the outputs to be checked, as well as the used turbine power profile $D_U$. During this sampling step:

it updates the value of the initial state vector of the system at the step k denoted $X_0^k$ (assuming here that the complete state is reconstructed), from the input data, it calculates the sequence $\overline{U_S}$ of the optimal commands by the function fmincon, it applies from $t_j$ to $t_j + T_S$ the first element $U_S^j$ of the command sequence calculated over the sampling period to the real system, it memorizes the rest of the sequence of commands $U_0^{j+1} = (U_S^{j+1} \ldots U_S^{j+N_P})^T$ to initialize optimization at the next sampling step, and finally it memorizes the applied neutron poison command (in step j) and updates the delayed neutron poison command $\widetilde{u_Q}$.

The supervisor 31 alone, for a scenario corresponding to a power ramp from 100%PN to 60%PN at 5%PN/min, makes it possible to obtain the following performances:

$|\Delta T_m^{max}| = 0.82°$ C. $\leq 1.5°$ C.; $|\Delta AO^{max}| = 4.62\%AO < 5\%AO$; $|\Delta P_{bank}^{max}| = 22.97$ PE $\leq 30$ PE These performances are correct for Tm and Pbank, but are at the authorized limit for AO.

Figure 10:
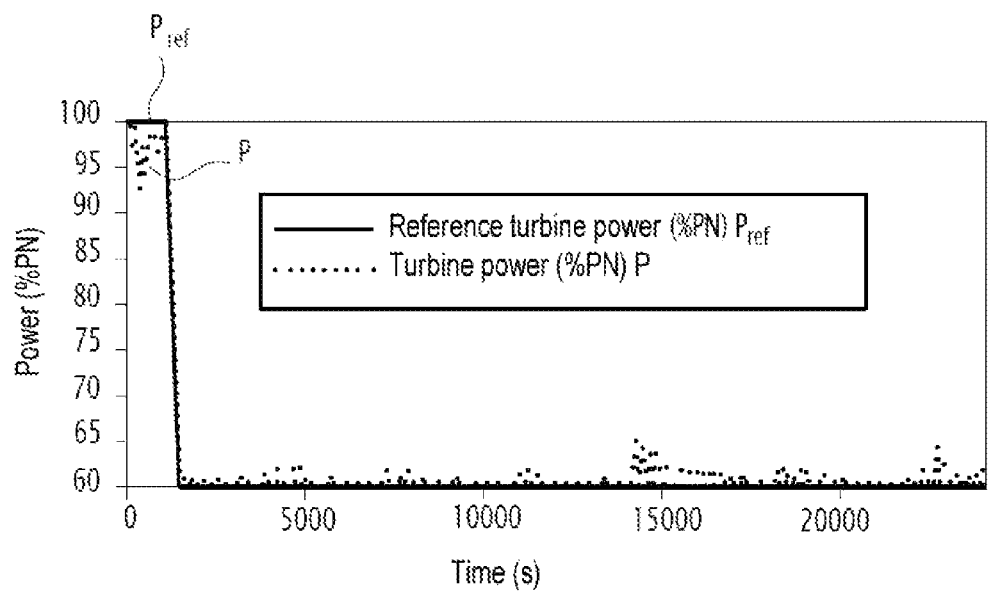
FIG. 10 is a graphic representation of the evolution of the power demanded from the turbine when the reactor operates under frequency control.
Figure 11:
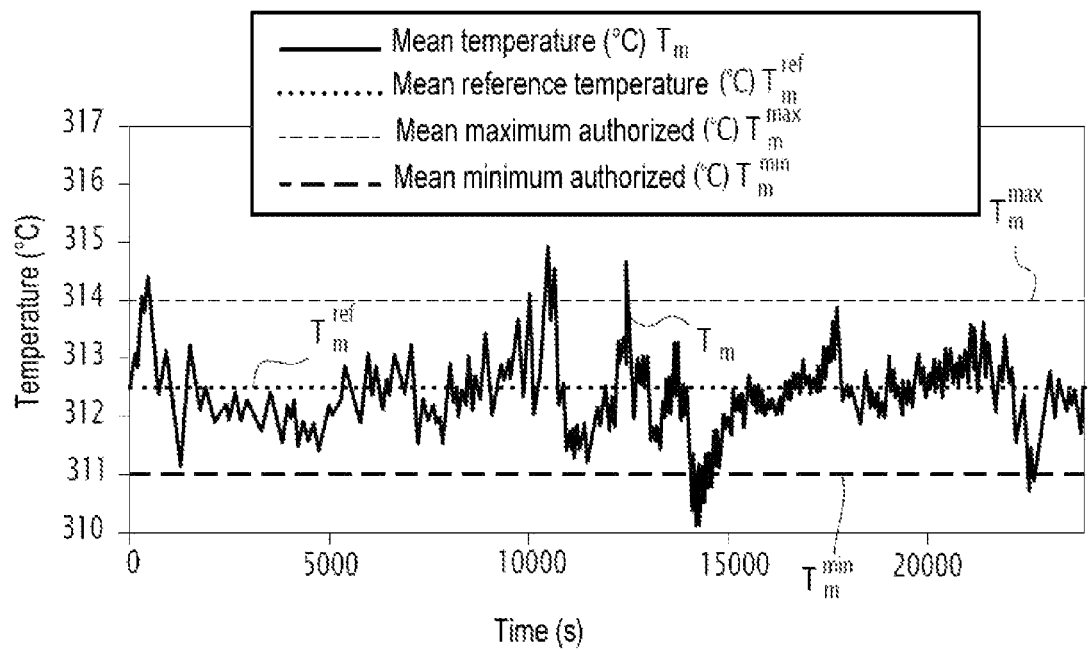
FIG. 11 is a graphical representation of the performance obtained with the supervisor alone in the operating case of FIG. 10.
Figure 12:
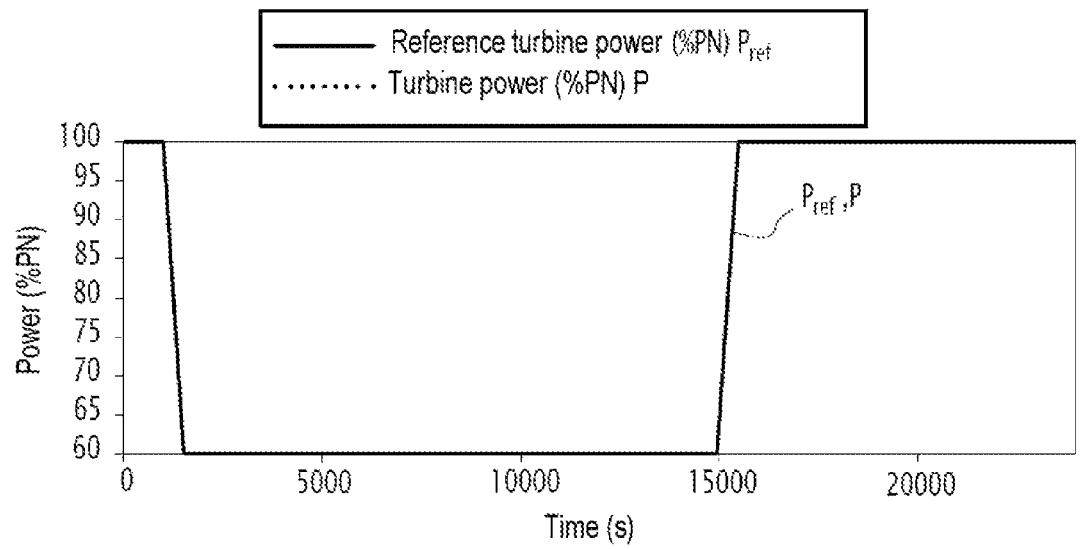
FIGS. 12 to 19 are graphical representations of the results obtained with the method of the present disclosure, for a power demanded from the turbine forming a 100%-60%-100% PN ramp at 5%PN/min.
Figure 13:
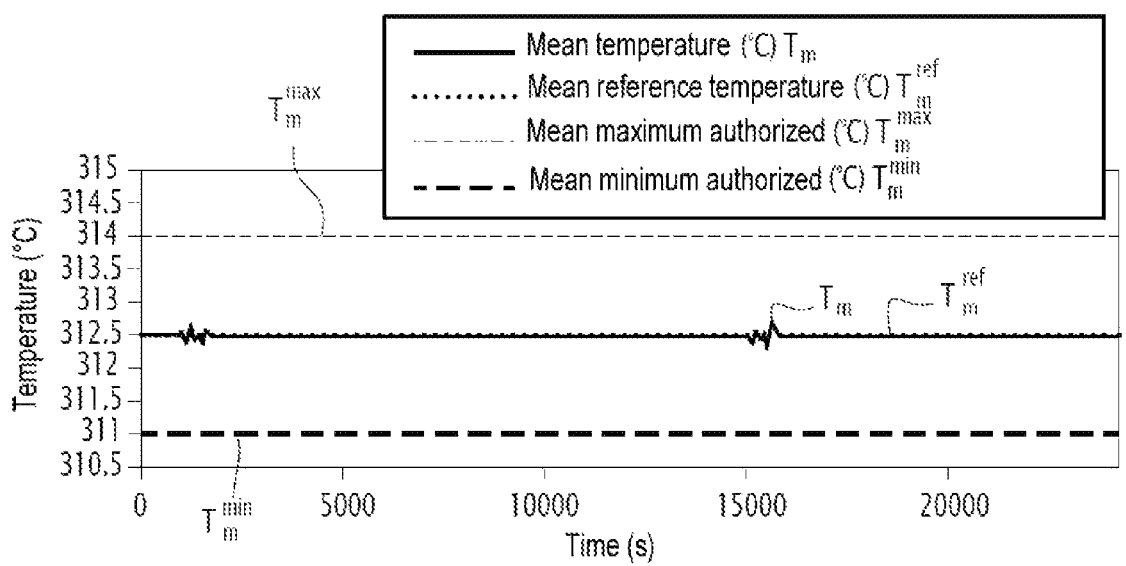
Figure 14:
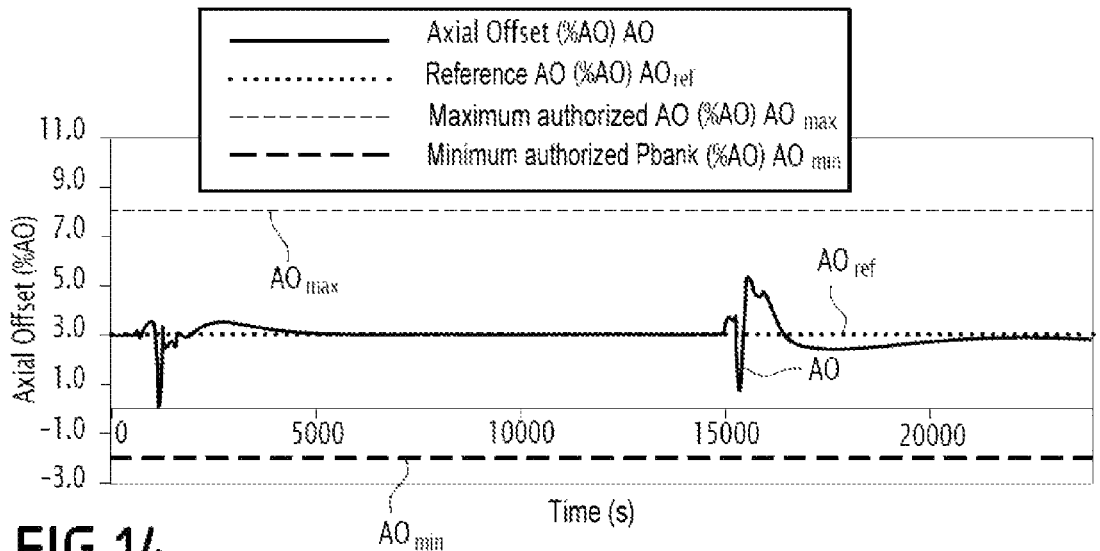
Figure 15:
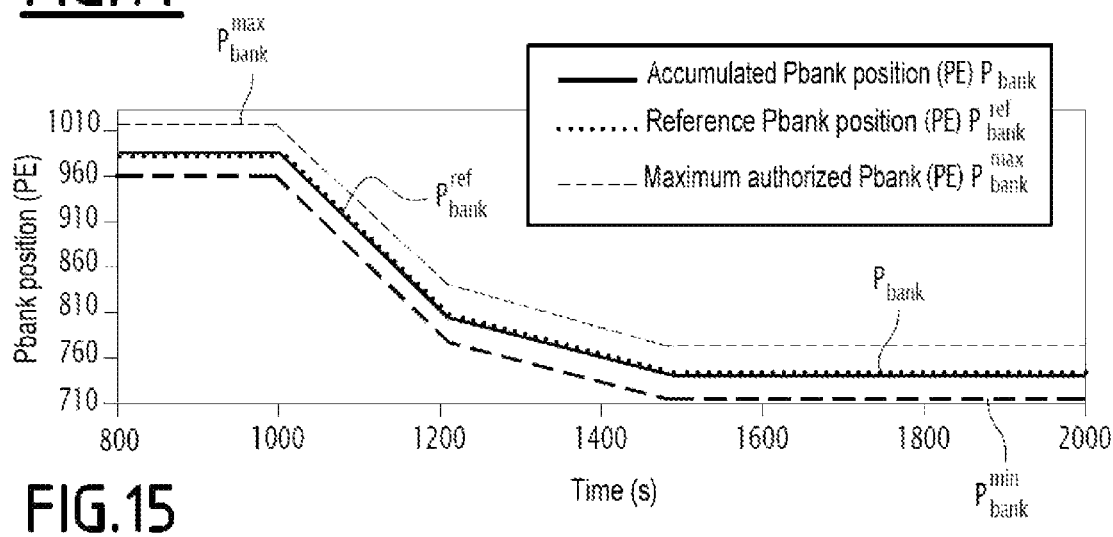
Figure 16:
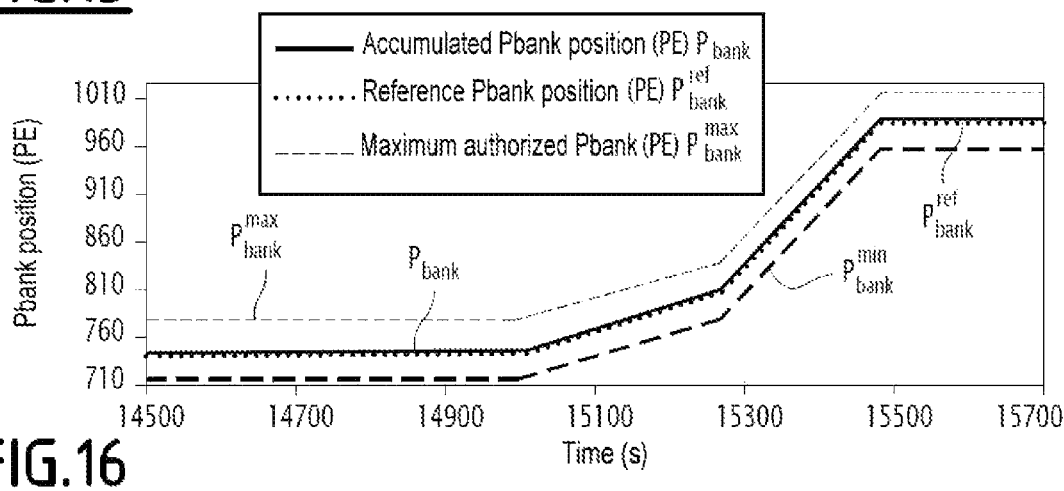
Figure 17:
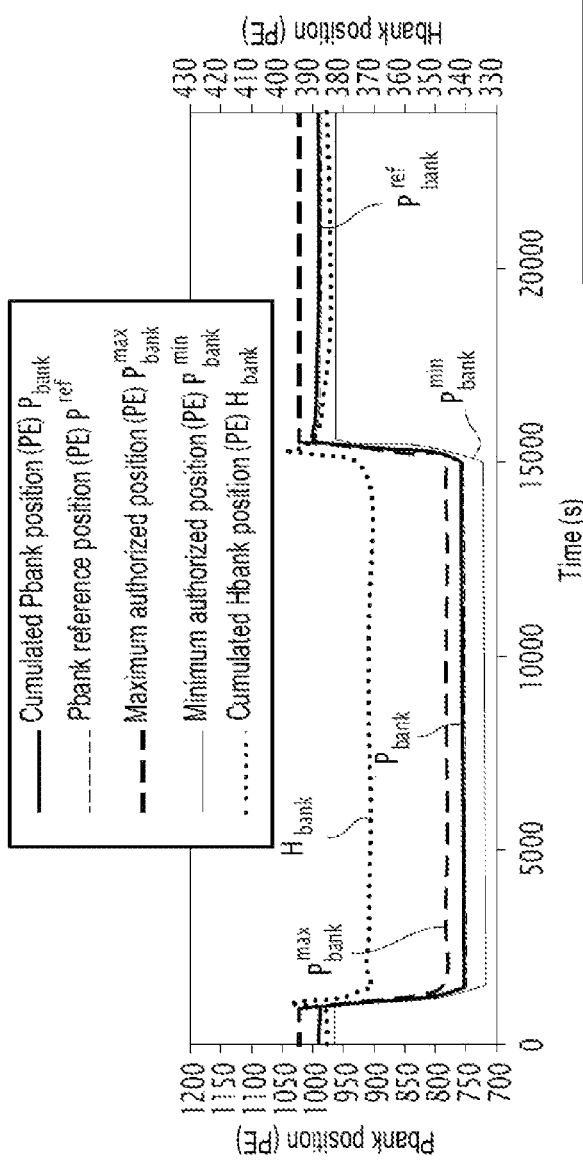
Figure 18:
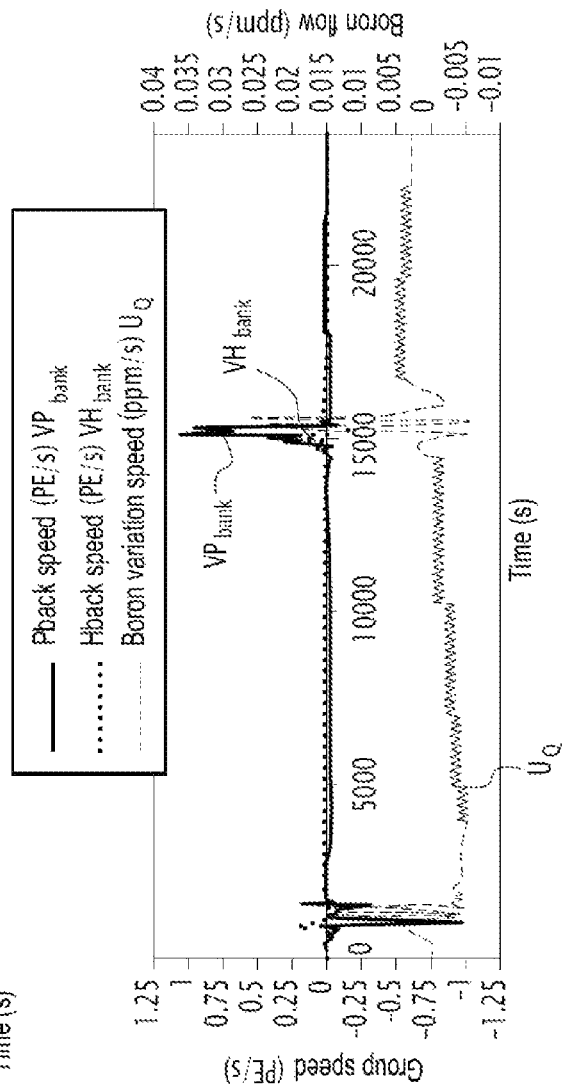
Figure 19:
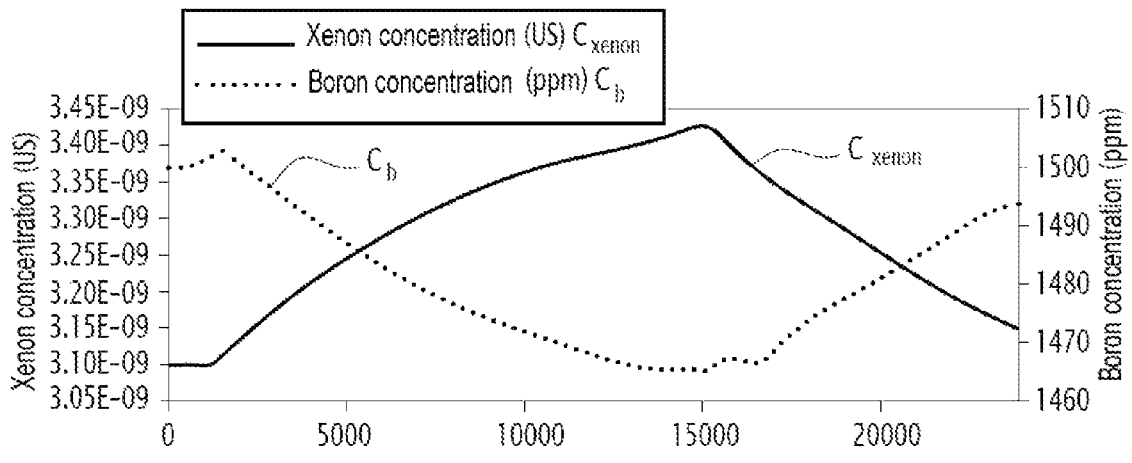
Figure 20:
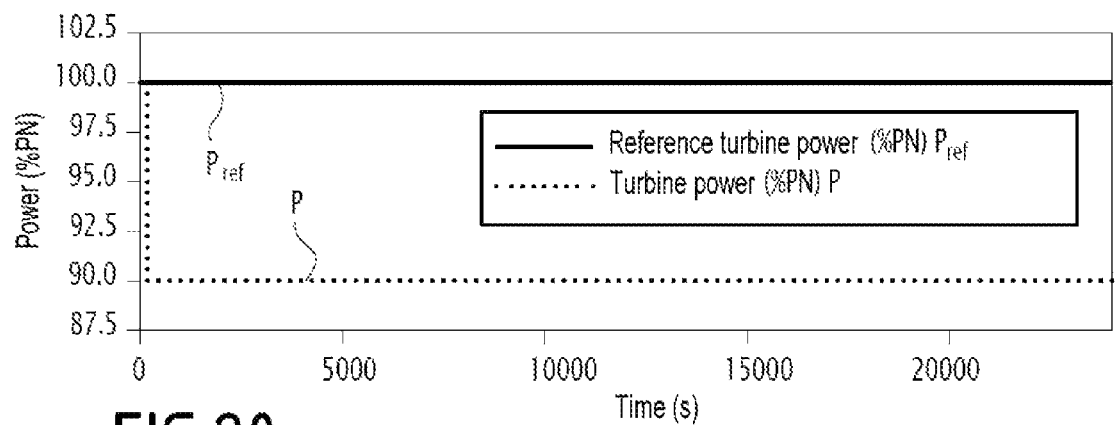
FIGS. 20 to 26 are graphical representations of the results obtained with the method of the present disclosure, for a power demanded from the turbine forming a descending power step 100%-90% PN.
Figure 21:
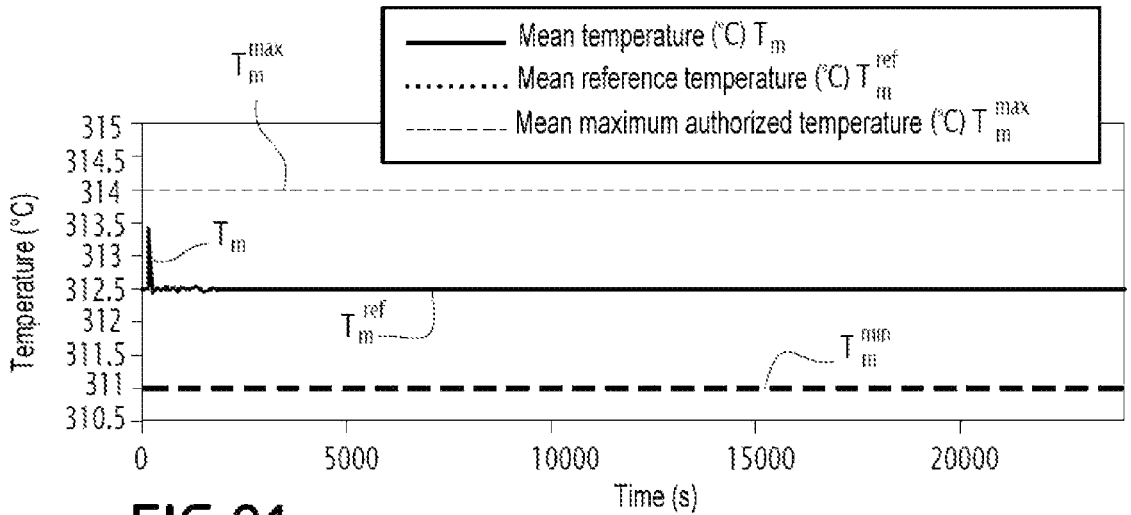
Figure 22:
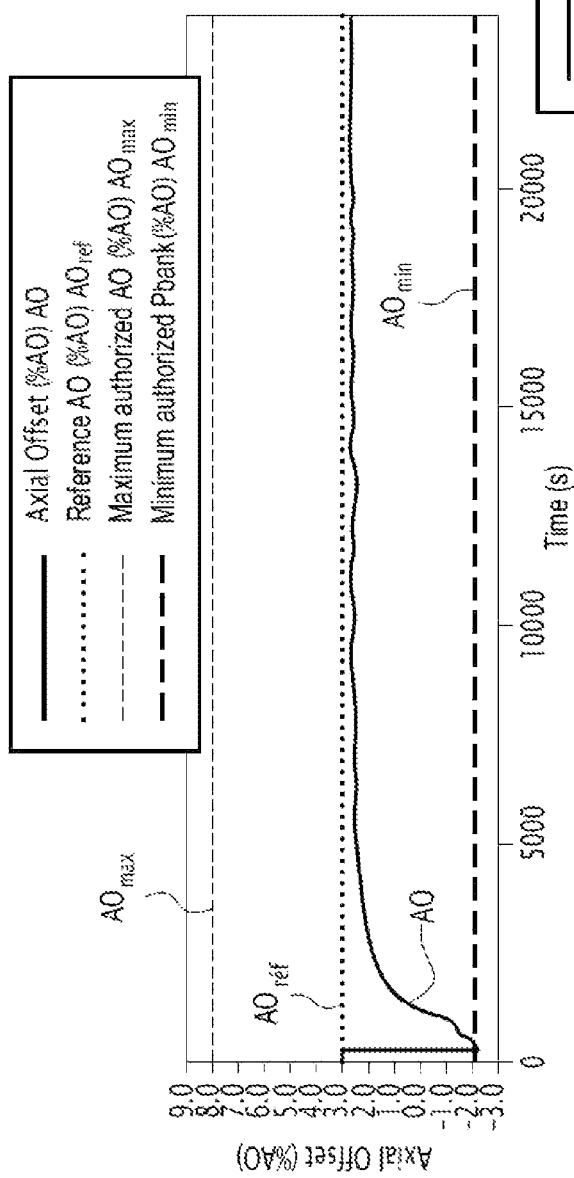
Figure 23:
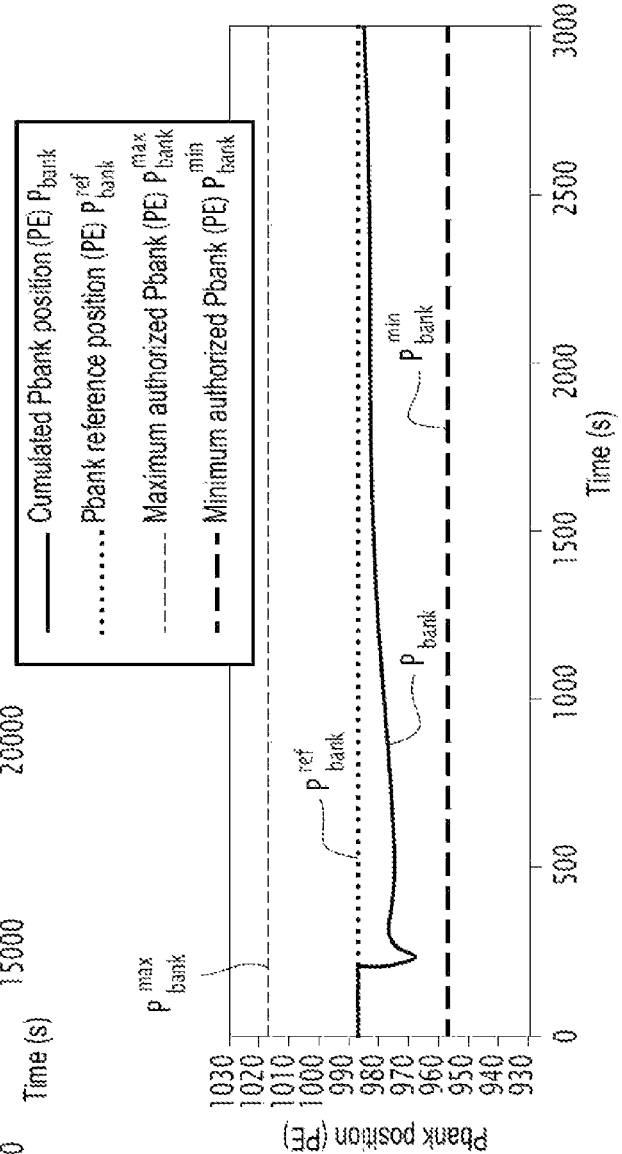
Figure 24:
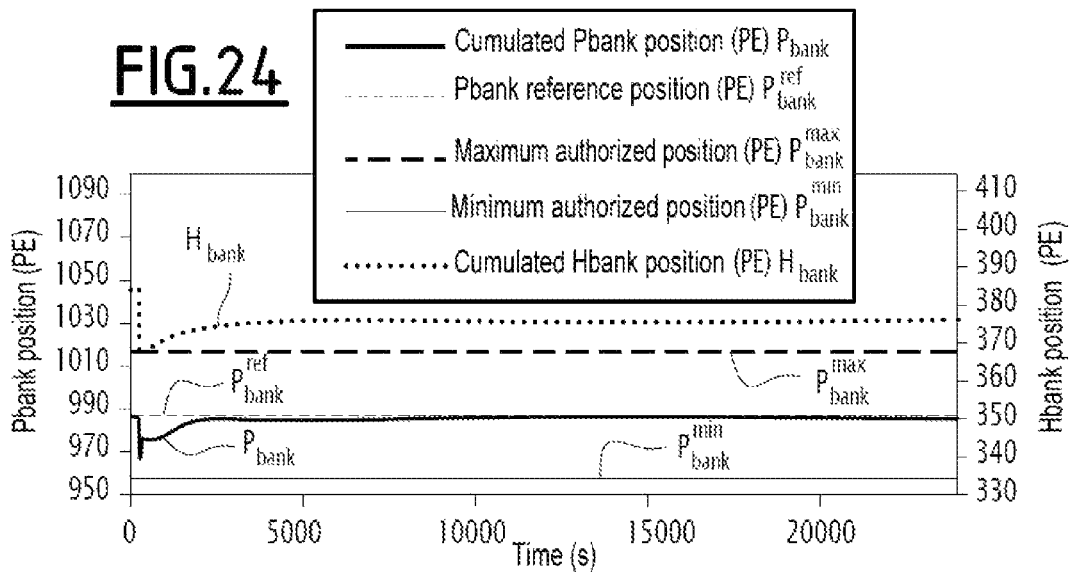
Figure 25:
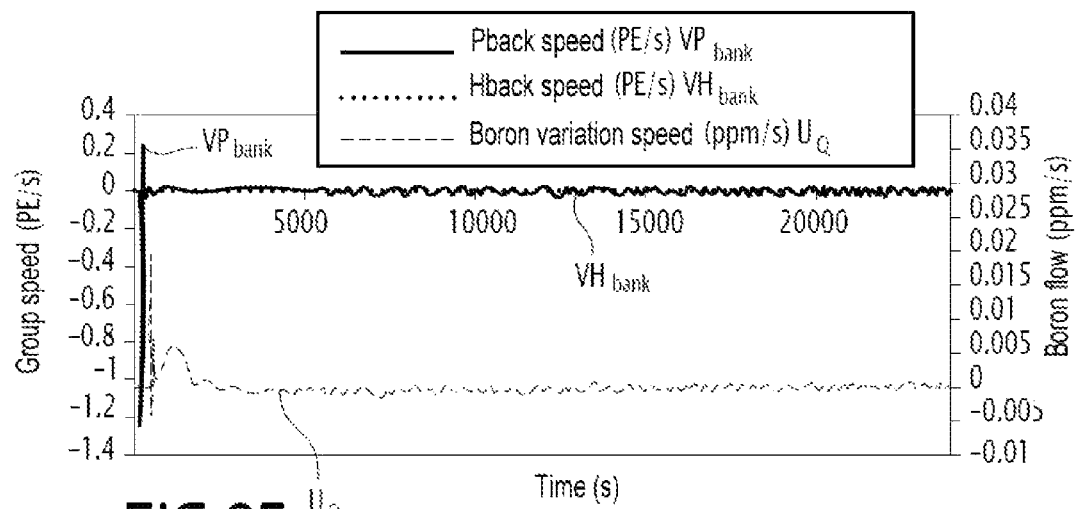
Figure 26:
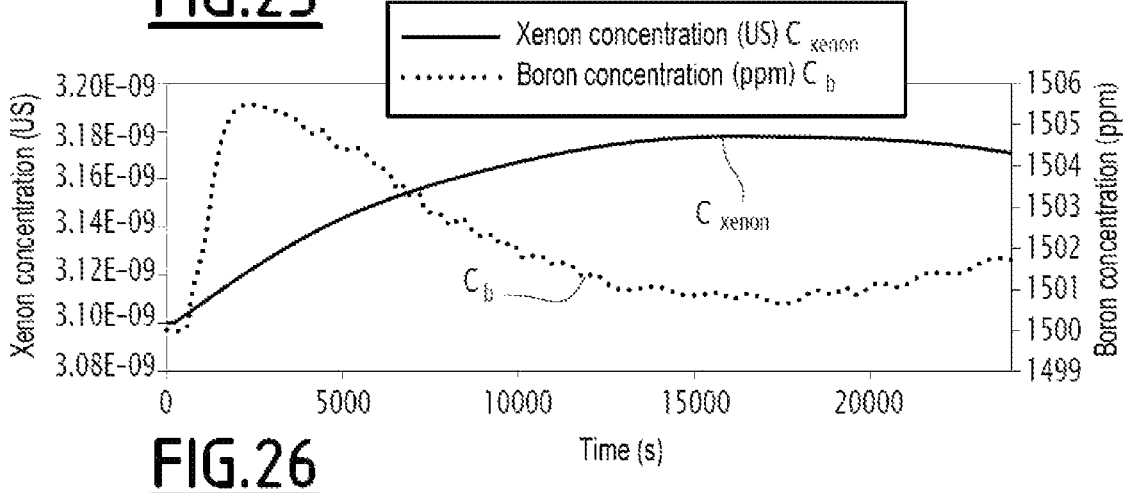
Figure 27:
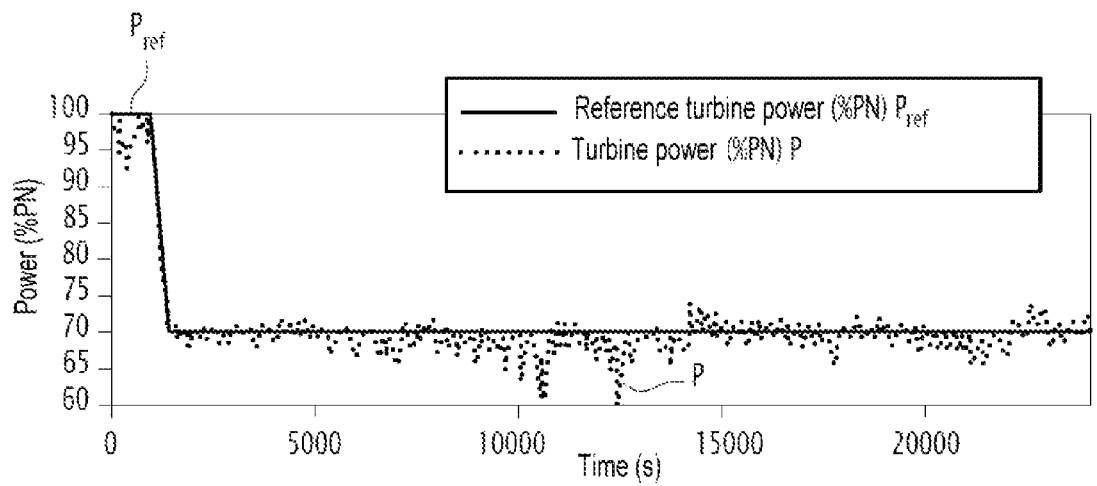
FIGS. 27 to 33 are graphical representations of the results obtained with the method of the present disclosure, for a power demanded from the turbine forming a 100%-70% PN ramp at 5%PN/min with frequency adjustment.
Figure 28:
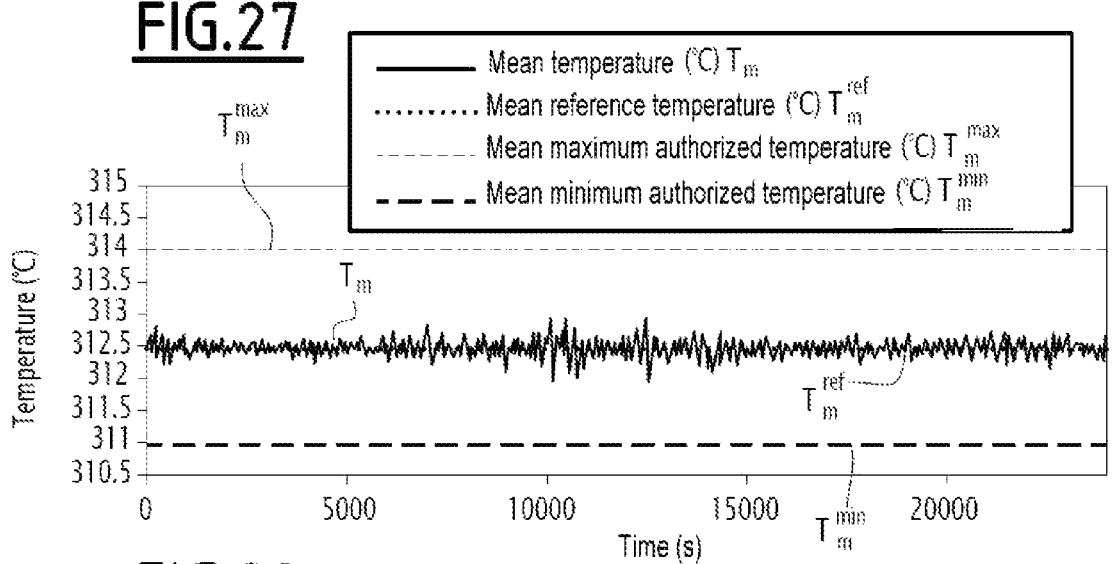
Figure 29:
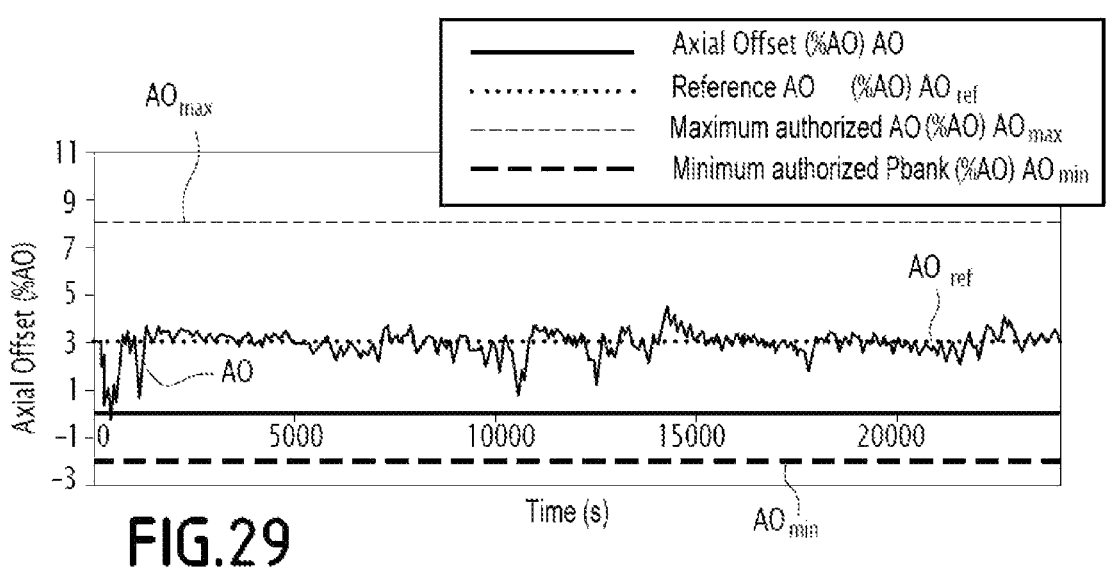
Figure 30:
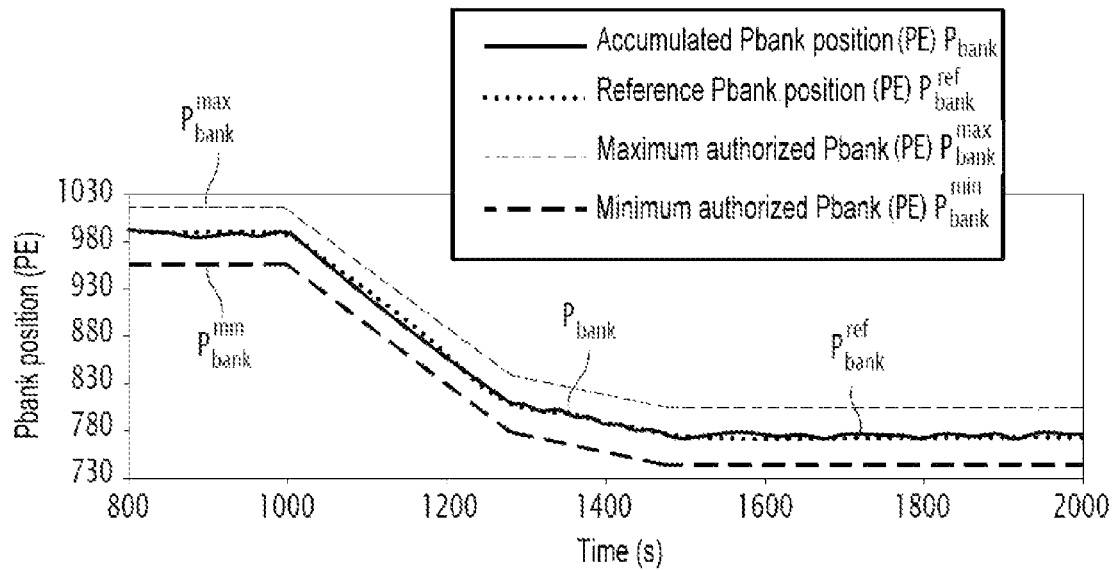
Figure 31:
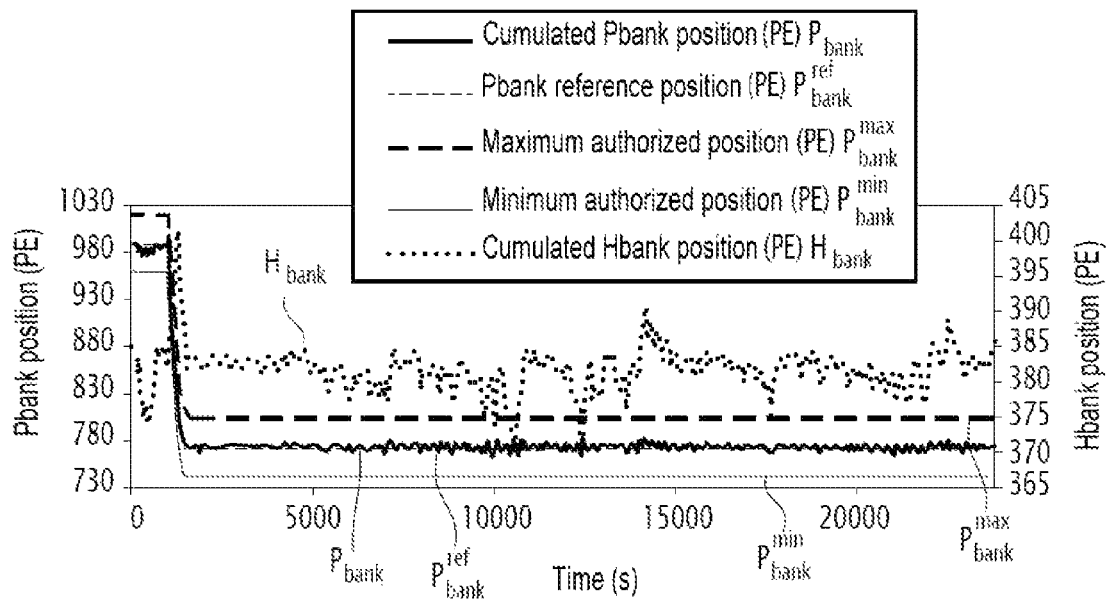
Figure 32:
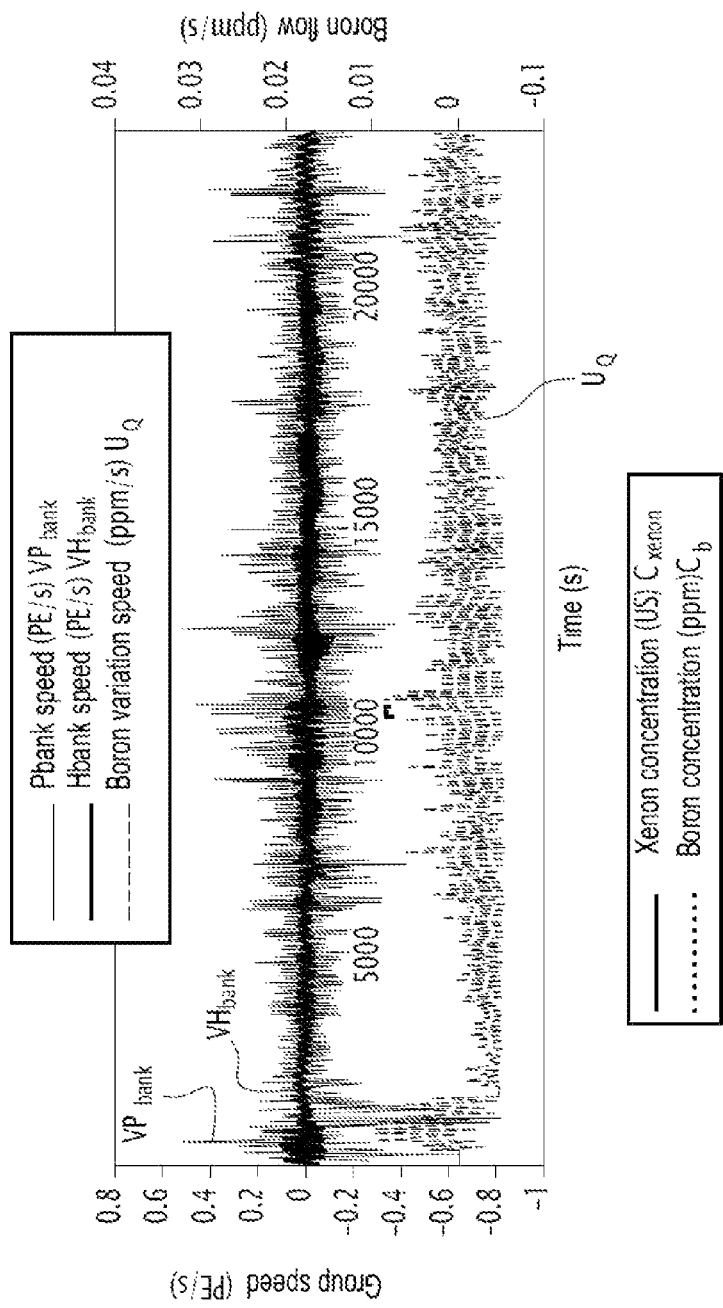
Figure 33:
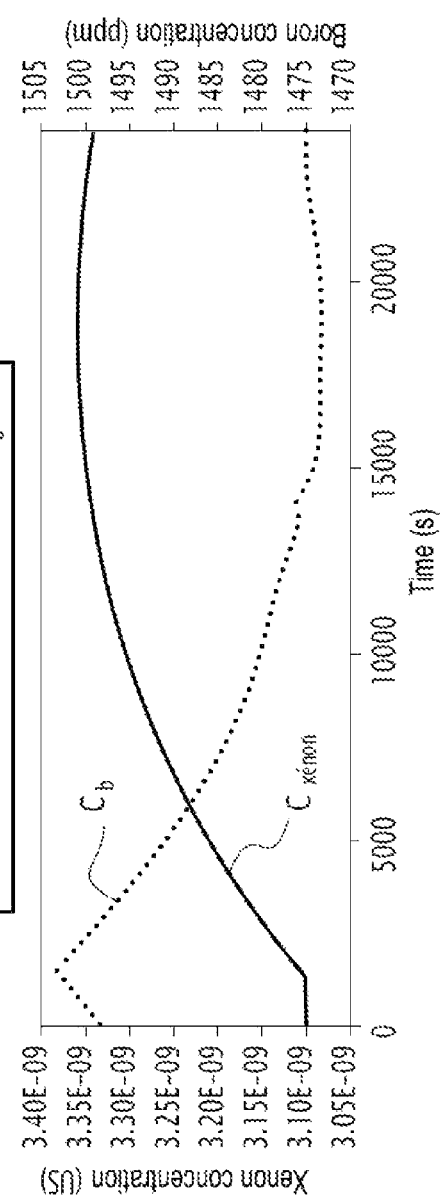

FIG. 11 illustrates the performance obtained with the supervisor in the case of a frequency adjustment where the nominal power follows the curve illustrated in FIG. 10.

We can see in FIG. 11 that the supervisor alone cannot reject the power variations due to the frequency adjustment. The temperature exceeds the upper and lower limits defined by the specifications.

The simulation results of the method of the present disclosure, implementing a hierarchical control comprising the supervisor and the multi-objective regulator with sequenced gains which will be called SMORC for Supervised Multi-Objective Regulator of the Core, will be described below.

The SMORC is simulated on the non-linear model of the reactor described above. In order to meet the actuator demand requirements, saturations will be introduced on them in accordance with the maximum demands defined in the specifications.

The behavior of the SMORC was first tested on a transient load at 5%PN/min from 100%PN to 60%PN followed by a load rise from 60%PN to 100%PN at the same speed. Secondly, it was tested for a power step of 10%PN. Finally, it was tested in the case of frequency adjustment superimposed on a transient load.

The SMORC simulation curves for a 100-60-100%PN at 5%PN/min power ramp are shown in FIGS. 12 to 19.

In this ramp scenario, the SMORC provides correct results against the control criteria. It may be seen that all the outputs to be regulated are kept in the authorized domain, defined by the LCOs, i.e. none of the outputs exceeds the maximum and minimum limits associated with it.

We note, first, a difference in mean temperature, AO and Pbank position of 0.19° C., 2.9%AO and 6.7PE respectively, or respectively 12%, 58% and 22% of the maximum authorized deviations for these variables. We note that the difference (in %) of the average temperature is lower than for the other variables, in particular thanks to the frequency weighting $W_{z_1}$, due to the prioritization of the average temperature compared to the other outputs. Then the simulations show zero static error.

In addition, the xenon is completely compensated and even anticipated by the regulator by variations in boron. It should also be noted that the speeds of the actuators are saturated during the simulation. They therefore cannot exceed the physical limits of the real actuators.

Let us now compare the results of the SMORC with those of the supervisor alone. We note that all the deviations of the outputs to be regulated by the supervisor alone, on the same scenario, are higher than in the case of the SMORC; in particular because the SMORC benefits from close control, unlike the supervisor alone. We may therefore see here the interest of the proposed hierarchical architecture.

Taking into account the preceding elements, we may therefore say that the SMORC presents good performances in this scenario.

The SMORC simulation curves for a 100-90%PN power step are shown in FIGS. 20 to 26.

There is a difference in mean temperature, AO and Pbank position of 1.0° C., 5.09%AO and 19PE respectively.

The conclusions of these simulation results are similar to those of the previous section, namely:
  The outputs to be regulated are all maintained in the authorized operating range in question. The overshoot for AO is very low and over a short period of time, which is largely tolerable
  The static error is zero.
  The actuator speeds and flow are saturated and therefore meet the associated requirements.
  Boron compensates well for the variation in xenon concentration.

An appreciable behavior of SMORC is the insertion of Hbank during load variation to aid in average temperature control, followed by extraction to provide AO control.

However, we note that, in this scenario, the AO is closer to the authorized limits than in the case of the load ramp. This is explained by the scenario studied here being considered to be the most dimensioning in the issue in question.

Finally, taking into account the previous elements, the SMORC provides good results, in accordance with the specifications.

The SMORC simulation curves for a 100-70%PN at 5%PN/min ramp with frequency adjustment are shown in FIGS. 27 to 33.

We note a difference in average temperature, AO and Pbank position of respectively 0.47° C., 3.3%AO and 10.1PE The conclusions of these simulation results are similar to those of the previous sections.

The specifications and the regulation method for the second control mode will now be described.

Only the points at which these specifications and this regulation method differ from those of the first embodiment will be detailed below.

The specifications do not include a criterion for the position deviation of the first set of groups.

The linear regulators of the sequenced gain control algorithm are again each determined for a specific operating point of the nuclear reactor. On the other hand, each operating point is characterized by the power demanded from the turbine(s), and typically only by this power.

The commands are only the speed of the first set (group R), as well as the rate of injection of neutron poison or diluent fluid.

The controlled operating parameters only comprise the mean core temperature and the axial power imbalance.

The outputs may comprise, in addition to those indicated for the first control mode, the power demanded from the turbine(s).

The specifications and the regulation method for the third control mode will now be described.

Only the points by which these specifications and this regulation method differ from those of the first embodiment will be detailed below.

The specifications do not include a criterion for the position deviation of the first set of groups.

The commands are only the speed of the first set, as well as the rate of injection of neutron poison or diluent fluid.

The controlled operating parameters only comprise the mean core temperature and the axial power imbalance.

The outputs may comprise, in addition to those indicated for the first control mode, the power demanded from the turbine(s).

According to an alternative embodiment applicable to the three control modes, the sequencing of the regulator is carried out by taking into account other parameters, such as, for example, the rate of combustion (burn-up) or the cycles. In other words, the gains of the gain matrices $K_p$ and K1 vary as a function of these parameters. To do this, we always proceed in the same way, by establishing linear models around predetermined operating points and by interpolating the gains. However, the operating points are no longer characterized by a single parameter, but by three parameters which vary. These parameters may be, for example, the position of Pbank, the rate of combustion (burn-up), and the cycle.

According to a second aspect, the present disclosure relates to the nuclear reactor 1 described above. This nuclear reactor comprises the core 5 and the regulation assembly 25 for regulating the operating parameters of the core, these operating parameters comprising at least the mean temperature of the core and the axial power imbalance.

The nuclear reactor 1 further comprises:
  a device 27 for acquiring a current value of at least one input $D_U$, $D_P$,
  a device 29 for acquiring a current value Y of an output vector, the outputs comprising at least the operating parameters.

The regulation assembly 25 comprises:
  a module 35 for developing a reference value $Y_{ref}$ of the vector of outputs, using the current value of the at least one input signal $D_U$, $D_P$;
  the supervisor 31, programmed to develop a vector $U_S$ of control values of the nuclear reactor by implementing a predictive control algorithm, using at least said current value of at least one input $D_U$, $D_P$ and the current value Y of the output vector;
  the regulator 33, programmed to develop a vector $u_k$ of corrective values for the commands of the nuclear reactor by implementing a sequenced gain control algorithm, using the current value Y of the vector of the outputs and the reference value $Y_{ref}$ of the vector outings;
  a module 37 for developing a vector U of corrected values of the commands of the nuclear reactor, using the vector $U_S$ of the values of the commands produced by the supervisor 31, and the vector $u_k$ of the corrective values of the commands produced by the regulator 33;

a module 39 for regulating the operating parameters of the nuclear reactor, controlling actuators by using the vector U of the corrected values of the controls.

The nuclear reactor 1 typically comprises:

a tank 3;

a core 5 comprising a plurality of nuclear fuel assemblies, placed in the tank 3;

clusters 7 for controlling the reactivity of the core 5, and mechanisms 9 configured to move each cluster 7 in the direction of insertion into the core 5 or in the direction of extraction out of the core 5;

a primary circuit 10 for cooling the core 5 in which a primary coolant circulates, comprising cold and hot branches 11, 13 pierced in the tank 3 and through which the primary coolant respectively enters the tank 3 and leaves the tank 3;

an injection circuit 15, configured to selectively inject a neutron poison or diluent fluid without neutron poison into the primary heat transfer fluid.

The neutron poison is typically boron. The diluent fluid is typically water.

In this case, the controls advantageously comprise at least one rate of movement of the control clusters and at least one injection rate of neutron poison or of diluting fluid.

Typically, the control assembly 25 is configured to move the clusters 7 in groups. The clusters of the same group are moved together, and are always all in the same insertion position.

The groups are advantageously divided into one or more sets. The distribution of the groups and their use depend on the control mode of the nuclear reactor.

In certain control modes, several groups are brought together in a first set.

In this case, the groups of the first set are typically moved sequentially. By this is meant that they are inserted one after the other, with an overlap which is predetermined, as described below. Alternatively, the overlap may be variable.

According to an alternative embodiment, all the groups of the first set are moved together. This is understood to mean that they are all always in the same insertion position and move together.

In other control modes, the first set has only one group.

In some control modes, other groups are brought together in a second set.

In this case, the groups of the second subset are typically moved together.

In other control modes, all the groups are gathered in the first set, and there is no second set.

Several examples of control mode will be detailed below, inspired respectively by modes T, G and A.

In a control mode inspired by T mode, particularly suited to the EPR (European Pressurized Reactor), the groups are divided into two sets:

the first set, called Pbank, a second set, called Hbank.

The first set is particularly well suited for controlling the average temperature Tm. The second set Hbank is typically particularly well suited for controlling the axial offset AO.

The groups of the first Pbank set are moved sequentially. The groups of the second Hbank set are moved together.

In a second control mode, inspired by G mode, the groups are divided into two sets:

the first set comprises the R group, formed of black clusters, i.e. of very absorbent clusters;

the second set, called PCG for Power Compensation Group, is made up of groups G1 and G2 (G for gray clusters) and groups N1 and N2 (N for black clusters). Gray clusters are relatively less absorbent than black clusters.

The groups of this second subset are inserted sequentially. Advantageously, they are inserted as a function of the electrical power requested from the turbine.

In this second control mode, the AO is advantageously controlled mainly by injections of neutron poison or of diluent fluid.

In a third control mode, inspired by mode A, the functional groups are all grouped together in the first set, here designated by the acronym DCBA.

This is typically made up of four groups A, B, C and D, which are inserted sequentially like the Pbank.

The first set is particularly well suited for controlling the average temperature Tm.

In this third control mode, the AO is advantageously controlled mainly by injections of neutron poison or of diluent fluid.

In certain control modes (in the first control mode for example), the at least one rate of movement of the control clusters typically comprises the rate of movement of the groups of the first Pbank set and the rate of movement of the groups of the second Hbank set. These speeds are noted $vP_{bank}$ and $vH_{bank}$ respectively.

In other control modes (in the second and third control modes for example), the at least one rate of movement of the control clusters typically corresponds to the rate of movement of the groups of the first set.

The regulation assembly 25 is configured to implement the regulation method which has been described above.

In particular, the supervisor 31 and the regulator 33 are as described above with respect to the regulation method.

Modules 35 and 37 are also as described above.

The devices 25, 27 are as described above.

The operating parameter regulation module 39 is configured to send the commands to the actuators, these actuators being the mechanisms 9 for moving the clusters 7 and the injection circuit 15.

Preferably, the management of the groups is carried out as described above, in particular the distribution of the groups in the first and second sets, Pbank and Hbank, and the movement of the first and second sets.

What is claimed is:

1. A method of regulating operating parameters of a nuclear reactor, the nuclear reactor comprising:

a tank;

a core comprising a plurality of nuclear fuel assemblies placed in the tank;

control clusters for controlling the reactivity of the core, and drive mechanisms configured to move each control cluster in the direction of insertion into the core or in the direction of extraction out of the core;

a primary circuit for cooling the core in which circulates a primary coolant fluid, comprising cold and hot branches pierced in the tank and through which the primary coolant respectively enters into the tank and leaves the tank; and an injection circuit configured to selectively inject into the primary coolant fluid a neutron poison or diluent fluid without neutron poison, the operating parameters comprising at least a mean core temperature and an axial power imbalance, the method comprising the following steps:

acquiring a current value of at least one input;
acquiring a current value of a vector of outputs, with outputs comprising at least the operating parameters;
developing a reference value of the vector of outputs, using the current value of the at least one input;
developing of a vector of control values of nuclear reactor controls by a supervisor implementing a predictive control algorithm, using at least said current value of the at least one input and the current value of the vector of outputs;
developing of a vector of corrective values of the nuclear reactor controls by a regulator implementing a sequenced gain control algorithm, using the current value of the vector of outputs and the reference value of the vector of outputs, the sequenced gain control algorithm comprising a plurality of linear regulators, each determined for regulating the operating parameters around a determined operating point of the nuclear reactor, said operating points being scaled to cover a nuclear reactor power range of 25% to 100% of a rated nuclear reactor power;
developing of a vector of corrected values of the controls of the nuclear reactor, by using the vector of control values of the controls developed by the supervisor and the vector of the corrective values of the controls developed by the regulator;
regulating the operating parameters of the nuclear reactor, by controlling the drive mechanisms to move the control cluster and by controlling the injection circuit to selectively inject into the primary coolant fluid the neutron poison or diluent fluid, using the vector of the corrected values of the nuclear reactor controls, the nuclear reactor controls comprising at least one rate of movement of the control clusters and at least one rate of injection of the neutron poison or of diluent fluid.

2. The method as recited in claim 1, wherein the control clusters are moved in groups, one or more groups being gathered in a first set, the nuclear reactor controls comprising at least one rate of movement of the group(s) of the first set.

3. The method as recited in claim 2, wherein other groups are gathered in a second set, the nuclear reactor controls comprising, in addition to the rate of movement of the group(s) of the first set, at least one rate of movement of the group(s) of the second set.

4. The method as recited in claim 2, wherein the groups of the first set are moved sequentially.

5. The method as recited in claim 2, wherein the first set has only one group.

6. The method as recited in claim 2, wherein the operating parameters further comprise the position of insertion of the groups of the first set.

7. The method as recited in claim 1, wherein the nuclear reactor comprises one or more turbines supplied with steam by the primary circuit, the at least one inlet being power demanded from the turbine(s) of the nuclear reactor.

8. The method as recited in claim 7, wherein the power supplied by the turbine(s) of the nuclear reactor comprises a programmed power according to a predetermined program, and a power disturbance, the reference value of the vector of the outputs being developed using said programmed power alone.

9. The method as recited in claim 1, wherein the outputs include, in addition to the operating parameters, a temperature of the primary coolant in the hot branch, and a thermal power of the core.

10. The method as recited in claim 1, wherein the control clusters are moved in groups, one or more groups being gathered in a first set, the nuclear reactor controls comprising at least one rate of movement of the group(s) of the first set,
wherein each operating point is characterized by a determined insertion position of the first set of groups.

11. The method as recited in claim 1, wherein each linear regulator is expressed in the following form:

$$u_K = K(s) \cdot y = Kp(s)y_1 + Ki(s)y_2 \text{ with } y_1 = y \text{ and } y_2 = z$$

where $K_p$ and $K_1$ are gain matrices, s is Laplace variable, y being an output deviation vector between the current value of the vector of outputs and the reference value of the vector of outputs, z being a vector deviation of operating parameters between the current value of the vector of the operating parameters to be checked and $u_K$ the reference value of the vector of the operating parameters to be checked, and being the vector of the corrective values of the nuclear reactor controls.

12. The method as recited in claim 11, wherein the method comprises a step of obtaining linear regulators, comprising for each linear regulator the following sub-steps:
developing of a linearized model of the nuclear reactor by linearization of a non-linear model of the nuclear reactor at the corresponding operating point, the linearized model relating:
the output deviation vector and the operating parameter deviation vector on the one hand, with
at least one among a disturbance of the at least one input, a disturbance of the vector of control values, a disturbance of the output deviation vector, and the vector of the corrective values of the nuclear reactor controls, on the other hand,
the linearized model and the linear regulator thus forming a looped system for said insertion position;
determining operating constraints of the nuclear reactor to be respected for predetermined disturbances of the at least one input or predetermined disturbances of the vector of the values of the predetermined nuclear reactor controls or disturbances of the deviation vector output;
translating each operating constraint into a digital condition to be respected for a transfer function between:
the disturbance of the at least one input, or the disturbance of the vector of control values, or the disturbance of the output deviation vector on the one hand, and
either the difference between the current value of one of the operating parameters and the reference value of said operating parameter, or the difference between the current value of one of the outputs and the reference value of said output, or one of the corrective values of the controls on the other hand; and
determining the gains of the gain matrices $K_p$ and $K_1$, said gains being determined by an optimization algorithm so as to stabilize at least the looped system for the corresponding operating point and to satisfy the digital conditions corresponding to all the operating constraints.

13. The method as recited in claim 12, wherein one or more of the following operating constraints are taken into account to obtain the linear regulator:
a difference $\delta T_m$ between a current value of $T_m$ and a reference value $T_{m,ref}$ is between $-\Delta T_m^{max}$ et $+\Delta T_m^{max}$;
a difference between the current value of AO and a reference value $AO_{ref}$ is between $-\Delta AO^{max}$ et $\Delta AO^{max}$;

the rate of movement of the clusters is less than $V_{barres}^{max}$;

a variation in neutron poison concentration is less than $u_Q^{max}$, $u_Q^{max}$ being the rate of increase in the concentration of neutron poison in the primary circuit resulting from an injection of neutron poison at a flow rate $Q_{bor}^{max}$;

to be respected at least for a disturbance which is a power step demanded from the turbine(s) of ±P% of a nominal power PN of the nuclear reactor, P being between 5 and 15%.

14. The method as recited in claim 13, wherein said one or more operating constraints are translated into one or more of the following digital conditions:

$\|W_{T_m} \cdot T_{\delta T_m \to d_p}\|_\infty \leq 1$, where $T_{\delta T_m \to d_p}$ is a transfer function between said power step and $\delta T_m$, with $$W_{T_m} = \frac{\Delta T_m^{max}}{\Delta P_{max}},$$

$\Delta P_{max} = P\% \cdot PN$;

$\|W_{AO} \cdot T_{\delta AO \to d_p}\|_\infty \leq 1$, where $T_{\delta AO \to d_p}$ is a transfer function between said power step and $\delta AO$, with $$W_{AO} = \frac{\Delta AO^{max}}{\Delta P_{max}},$$

$\delta P_{max} = P\% \cdot PN$;

$\|W_K \cdot T_{Vbarres \to d_p}\|_\infty \leq 1$, where $T_{Vbarres \to d_p}$ is a transfer function between said power step and the rate of movement of the clusters, with $$W_K = \frac{V_{barres}^{max}}{\Delta P_{max}};$$

$\|W_Q \cdot T_{u_Q \to d_p}\|_\infty \leq 1$, where $T_{u_Q \to d_p}$ is a transfer function between said power step and the variation in the concentration of the neutron poison, with $$W_Q = \frac{u_Q^{max}}{\Delta P_{max}}.$$

15. The method as recited in claim 12, wherein the nuclear reactor comprises:

a tank;

a core comprising a plurality of nuclear fuel assemblies placed in the tank;

control clusters for controlling the reactivity of the core, and mechanisms configured to move each control cluster in the direction of insertion into the core or in the direction of extraction out of the core;

a primary circuit for cooling the core in which circulates a primary coolant, comprising cold and hot branches pierced in the tank and through which the primary coolant respectively enters into the tank and leaves the tank;

an injection circuit configured to selectively inject into the primary coolant fluid a neutron poison or diluent fluid without neutron poison;

the nuclear reactor controls comprising at least one rate of movement of the control clusters and at least one rate of injection of neutron poison or of diluent fluid, wherein the following operating constraint is taken into account to obtain the linear regulator:

a difference between the current value of $P_{bank}$ and a reference value of $P_{bank,ref}$ is between $-\Delta P_{bank}^{max}$ and $\Delta P_{bank}^{max}$;

to be respected at least for a disturbance which is a power step demanded from the turbine(s) of ±P% of a nominal power PN of the nuclear reactor, P being between 5 and 15%.

16. The method as recited in claim 15, wherein said operating constraint is translated into the following digital condition:

$\|W_P \cdot T_{\delta P_{bank} \to d_p}\|_\infty \leq 1$, where $T_{\delta P_{bank} \to d_p}$ is a transfer function between said power step and $P_{bank}$, with $$W_P = \frac{\Delta P_{bank}^{max}}{\Delta P_{max}},$$

$\Delta P_{max} = P\% \cdot PN$.

17. The method as recited in claim 12, wherein the following operating constraint is taken into account to obtain the linear regulator:

a disturbance which is a power step demanded from the turbine(s) of ±P% of a nominal power PN of the nuclear reactor, P being between 5 and 15%, causes a minimum variation of the operating parameters;

said constraint being translated into the following digital condition:

$$\min_{K \in \Omega} \|W_z \cdot T_{z \to d_p}\|_2,$$

where K denotes the gain matrices $K_p$ and $K_i$, $\Omega$ denotes the set of gain matrices stabilizing the loop system, $T_{z \to d_p}$ is the transfer function between said power step and the vector (z) of deviation of operating parameters, $W_z$ is a predetermined frequency weighting matrix.

18. The method as recited in claim 12, wherein each linearized model takes into account the delay associated with the injection of the neutron poison using the following equations:

$$\frac{dC_b}{dt}(t) = \overline{u_Q}; \overline{u_Q} = R_B(s) \cdot u_Q; R_B(s) = \frac{\left(1 - \frac{h}{2n}s\right)^n}{\left(1 + \frac{h}{2n}s\right)^n}$$

where $C_b$ is a concentration of neutron poison in the or each primary circuit; $u_Q$ is a command to increase the concentration of neutron poison in the primary circuit resulting from a command for injecting neutron poison at a flow rate $Q_{bor}$, $\overline{u_Q}$ is a delayed command to increase the concentration of neutron poison in the primary circuit; s is Laplace variable; h is a value of the delay considered, typically between 100 and 500 seconds; n is an integer between 3 and 15.

19. The method as recited in claim 12, wherein, at a determined operating point, the gains of the gain matrices $K_p$ and $K_1$ are determined by the optimization algorithm so as to stabilize the looped system for said determined operating point and to stabilize the looped systems for at least the two neighboring determined operating points, while satisfying the digital conditions corresponding to all the operating constraints.

20. The method as recited in claim 1, wherein the supervisor predictive control algorithm uses said nonlinear model of the nuclear reactor.

21. A nuclear reactor comprising:
- a tank;
- a core comprising a plurality of nuclear fuel assemblies placed in the tank;
- control clusters for controlling the reactivity of the core, and mechanisms configured to move each control cluster in the direction of insertion into the core or in the direction of extraction out of core;
- a primary circuit for cooling the core in which circulates a primary coolant, comprising cold and hot branches pierced in the tank and through which the primary coolant respectively enters into the tank and leaves the tank;
- an injection circuit, configured to selectively inject into the primary coolant fluid a neutron poison or diluent fluid without neutron poison;
- a regulation assembly for regulating operating parameters of the core, the operating parameters comprising at least a mean temperature of the core and an axial power imbalance;
- a device for acquiring a current value of at least one input;
- a device for acquiring a current value of an vector of outputs, the outputs comprising at least the operating parameters;
- the regulation assembly comprising:
  - a module for developing a reference value of the vector of outputs, using the current value of the at least one input;
  - a supervisor programmed to develop a vector of control values of the nuclear reactor by implementing a predictive control algorithm, using at least said current value of at least one input and the current value of the vector of the outputs;
  - a regulator programmed to develop a vector of corrective values for the nuclear reactor controls by implementing a sequenced gain control algorithm, using the current value of the vector of the outputs and the reference value of the vector of the outputs, the sequenced gain control algorithm comprising a plurality of linear regulators, each determined for regulating the operating parameters around a determined operating point of the nuclear reactor, said operating points being scaled to cover a nuclear reactor power range of 25% to 100% of a rated nuclear reactor power;
  - a module for developing a vector of corrected values of the nuclear reactor controls, using the vector of the control values developed by the supervisor and the vector of the corrective values of the controls developed by the regulator;
  - a module for regulating the operating parameters of the nuclear reactor, by controlling the drive mechanisms to move the control cluster and by controlling the injection circuit to selectively inject into the primary coolant fluid the neutron poison or diluent fluid, using the vector of the corrected values of the controls, the nuclear reactor controls comprising at least one rate of movement of the control clusters and at least one rate of injection of neutron poison or of diluent fluid.

22. The nuclear reactor according to claim 21, wherein the regulating assembly is configured to move the control clusters in groups, one or more groups being gathered in a first set, the nuclear reactor controls comprising at least one rate of movement of the groups of the first set.

23. The nuclear reactor according to claim 22, wherein other groups are gathered in a second set, the nuclear reactor controls comprising, in addition to the rate of movement of the groups of the first set, at least one rate of movement of the groups of the second set.

* * * * *